Figure 1:
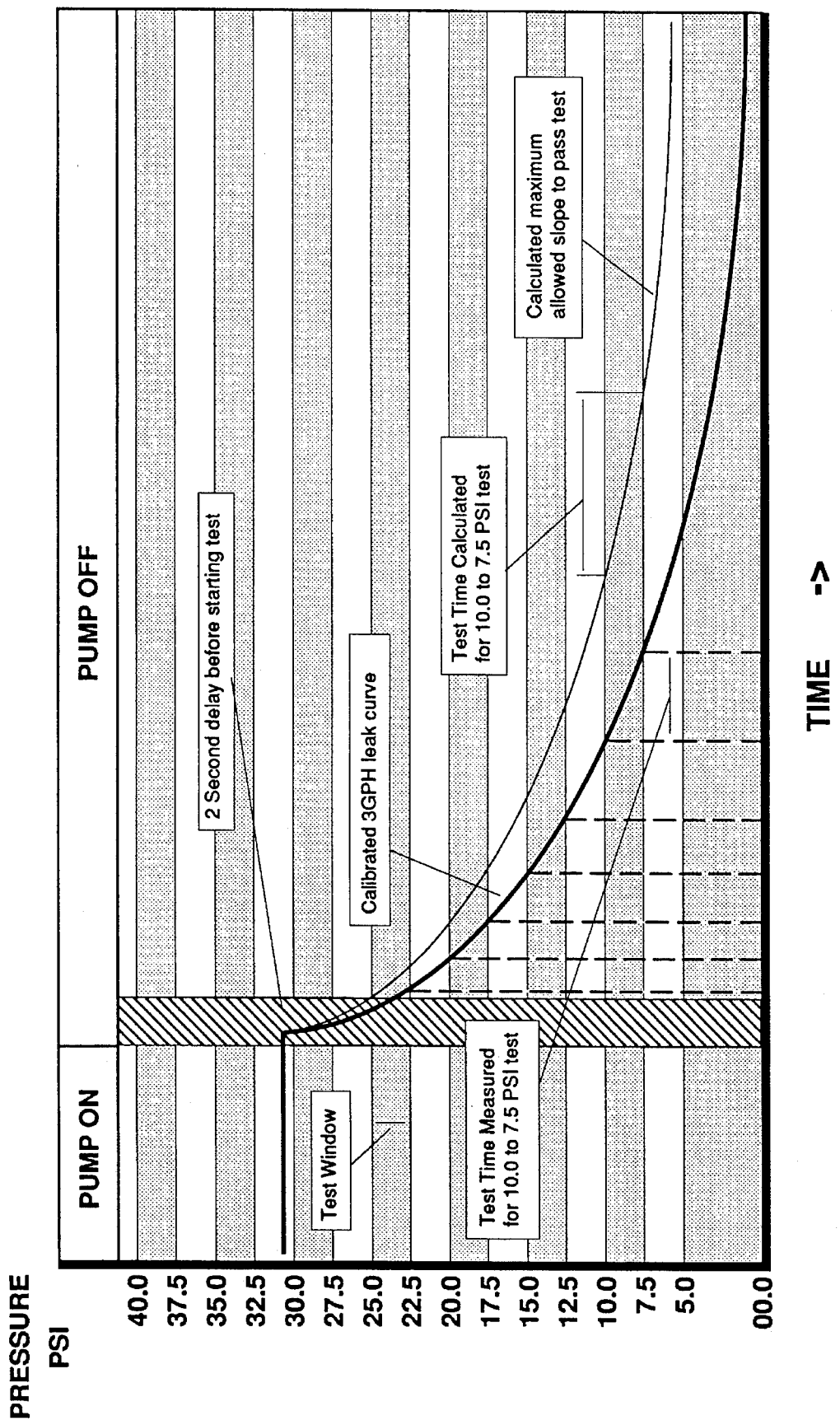

United States Patent [19]
Filippi et al.

[11] Patent Number: 5,526,679
[45] Date of Patent: Jun. 18, 1996

[54] AUTOMATICALLY CALIBRATED PRESSURIZED PIPING LEAK DETECTOR

[75] Inventors: Ernest A. Filippi, Porterville; Kenneth L. Miller, San Pedro, both of Calif.

[73] Assignee: Campo/Miller, Porterville, Calif.

[21] Appl. No.: 369,775

[22] Filed: Jan. 5, 1995

[51] Int. Cl.$^6$ ............................................. G01M 3/28
[52] U.S. Cl. ..................... 73/40.5 R; 340/605; 364/509; 364/558
[58] Field of Search ................... 73/40.5 R, 49.2 T, 73/49.2 R, 40, 49.1; 340/605; 364/509, 510, 558, 565

[56] References Cited

U.S. PATENT DOCUMENTS

| | | | |
|---|---|---|---|
| 3,188,127 | 6/1965 | Hazes | 292/224 |
| 3,738,531 | 6/1973 | Mitchell | 222/52 |
| 3,935,567 | 1/1976 | Reynolds | 340/242 |
| 3,962,905 | 6/1976 | Jouve | 73/40.5 R |
| 3,982,664 | 9/1976 | Robbins | 222/21 |
| 4,012,944 | 3/1977 | Covington et al. | 73/40.5 R |
| 4,109,512 | 8/1978 | Ledeen et al. | 73/40.5 R |
| 4,131,216 | 12/1978 | Gerstenmaier | 222/52 |
| 4,161,957 | 7/1979 | Schoellkopf | 137/205 |
| 4,305,068 | 12/1981 | Klein | 340/605 |
| 4,308,746 | 1/1982 | Covington | 73/40.5 R |
| 4,344,320 | 8/1982 | Haupt | 73/40.7 |
| 4,361,030 | 11/1982 | Heide | 73/40.5 R |
| 4,386,269 | 5/1983 | Murphy | 250/227 |
| 4,404,516 | 9/1983 | Johnson | 324/54 |
| 4,496,077 | 1/1985 | Zuehlsdorf | 222/61 |
| 4,523,452 | 6/1985 | Brayman | 73/40 |
| 4,524,606 | 6/1985 | McMahan et al. | 73/40 |
| 4,590,793 | 3/1986 | Staats | 73/40 |
| 4,608,857 | 9/1986 | Mertens | 73/40 |
| 4,658,986 | 4/1987 | Freed | 222/52 |
| 4,697,456 | 10/1987 | Maser | 73/592 |
| 4,709,576 | 12/1987 | Raabe | 73/40.5 R |
| 4,715,214 | 12/1987 | Tveter et al. | 73/49.2 |
| 4,723,441 | 2/1988 | Sweeney | 73/40.5 R |
| 4,797,007 | 1/1989 | Elmore | 374/143 |
| 4,811,252 | 3/1989 | Furuse | 364/556 |
| 4,835,717 | 5/1989 | Michel | 364/558 |
| 4,852,054 | 7/1989 | Mastandrea | 364/509 |
| 4,876,530 | 10/1989 | Hill | 340/605 |
| 4,918,977 | 4/1990 | Takahashi | 73/40.5 R |
| 4,958,296 | 9/1990 | Saitoh | 364/509 |
| 5,042,290 | 8/1991 | Geisinger | 73/40.5 R |
| 5,065,616 | 11/1991 | Schuster | 73/49.2 |
| 5,072,621 | 12/1991 | Hasselmann | 73/40.5 R |
| 5,078,006 | 1/1992 | Maresca | 73/40.5 R |
| 5,090,234 | 2/1992 | Maresca | 73/49.1 |
| 5,101,657 | 4/1992 | Lahlouh | 73/40.5 R |
| 5,102,012 | 4/1992 | Foster | 222/40 |
| 5,103,410 | 4/1992 | Slocum | 364/558 |
| 5,201,212 | 4/1993 | Williams | 73/40.5 R |
| 5,317,899 | 6/1994 | Hutchinson | 73/40.5 R |
| 5,361,622 | 11/1994 | Wall | 73/49.2 |
| 5,372,032 | 12/1994 | Filippi | 73/40.5 R |

*Primary Examiner*—Michael J. Brock
*Attorney, Agent, or Firm*—Sixbey Friedman Leedom & Ferguson; Evan R. Smith

[57] ABSTRACT

A pressure decay leak detection system is calibrated for a particular piping system using a leak mechanism with a known leak rate attached to the piping system. Pressure decay in the piping system is monitored while the system is leaking, pressure versus time data defining an acceptable pressure decay profile is stored. In one embodiment, this data is scaled to obtain a profile applicable to different leak rates. The detection system performs a test by sensing decaying pressure in the piping system, determining a slope of measured pressure decay versus time for an increment of pressure decay, comparing a slope of the observed pressure decay with a slope of the acceptable pressure decay profile, and providing a failure indication if the slope of the observed pressure decay exceeds the slope of the acceptable pressure decay profile.

17 Claims, 13 Drawing Sheets

AUTOMATICALLY CALIBRATED PRESSURIZED PIPING LEAK DETECTOR

BACKGROUND OF THE INVENTION

1. Field of the Invention

This invention describes equipment for testing underground pressurized motor fuel piping, for leaks into surrounding soil. Environmental regulations promulgated by Federal and State law, require such leak detection equipment.

2. Description of Prior Art

Many commercial companies are now selling line leak detection equipment, or plan to in the immediate future. The equipment currently available, fall into design categories of mechanical and electronic-mechanical designs.

Using application programmed micro-computer technology, line leak detectors utilize flow and pressure decay technology to perform the EPA mandated leak test.

Whether pressure decay or flow is used, the application programmed micro-computer, must compensate for any temperature differential between the fuel and the pipe wall. All third party approved systems compensate for temperature differential for the 0.1 GPH and 0.2 GPH test, for the 3 GPH test, compensation is not required for the maximum temperature differential of ±25 degree F., as specified by the EPA.

In early winter or spring, in some locales, for a short time interval, temperature differentials may exceed the ± degree F. temperature differential as specified by the EPA. In that case all existing line leak detectors may false alarm. In the Fall false leak alarms will be reported, and in the Spring leaks will not be reported. This phenomenon occurs, due to warm underground fuel tanks, filling cold piping and with warm piping being filled from cold underground fuel tanks, thusly the first condition reports false alarms and the second condition will conceal a leak.

Pressure decay line leak detectors, relate a pressure drop over time, to a leak rate. For this method to be accurate, temperature differential between fluid and the piping wall must be compensated for. Additionally the effects of differing piping bulk modului must be considered, usually by increasing the duration of the pressure decay measurement.

Flow line leak detectors automatically null out the effects of the piping bulk modulus, accomplished by testing with a constant pressure source. However temperature differentials between the fuel and pipe wall must be compensated for. The test is conducted by diverting flow through a small orifice, and directly measuring any flow, which thereby represents a leak rate.

The strategies used to compensate for temperature induced errors, employ waiting, multiple tests or direct measurement of the pipe wall and fluid, for temperature, thusly determining if any differential exists.

Differing piping bulk modului can effect the accuracy of a pressure decay leak test method. Piping bulk modulus, can be determined by measuring the volume of fluid released from a predetermined pressure, and utilizing a predetermined pressure drop. The bulk modulus thusly obtained is used to determine the appropriate time of test. The test time calculated corresponds to the desired leak rate to be detected, for pipe with the bulk modulus determined. For continuous operating piping, the piping bulk modulus will be unchanged, over time and use.

For flow line leak detectors varying piping bulk moduli, effects on leak detection, is removed by the use of a constant pressure source, during the test interval.

Because gasoline has a thermal expansion rate 6 to 7 times that of water, thermal effects can be significant. Pressure decay and flow line leak detectors, will false alarm if temperature is not adequately compensated for.

Temperature differentials as small as 1 degree centigrade can cause pressure fluctuations, as great as 10 PSI, depending on the gasoline formulation.

Since gasoline is formulated to performance varying with weather and altitude, a preset formula cannot be used, to predict pressure change with temperature, increase or decrease for a typical gasoline grade.

To avoid inducing temperature increase from the fluid pulsing, induced by the turbine pump during pumping, care must be taken in the leak detector design to minimize that effect, (this applicable to precision testing in pressure decay devices). For the 3 GPH test, the pump is off, also the precision test, this approach is utilized by at least one line leak detector manufacturer. For the 0.1 or 0.2 GPH test, one line leak detector manufacturer, will test with the pump off and another with the pump on. Some manufacturers utilize the turbine pump check valve and pressure relief valve, to trap pressure, while others supply valving to trap pressure for the test.

Flow line leak detectors, are sensitive to sand in the fuel plugging the flow orifice. Most flow line leak detector manufacturers include in their designs, filters to protect the flow detecting orifice from clogging.

Flow sensing line leak detectors depend on the submersible turbine pump, to provide the constant pressure source required. The test is performed with the dispensing nozzle closed, the pump operating and the flow if any diverted through a flow restricting orifice. Any flow is determined to represent a leakage rate. This method removes the problem of varying piping bulk modului, but temperature differentials remain, to be compensated for. Detecting gross leaks (broken pipe) or leaks as small as 3 GPH is easily within the state-of-the-art for most line leak detection devices, when temperature extremes do not exceed the EPA ±25 degree F. differentials of the fuel to pipe wall temperature difference. However, the EPA requirement failed to recognize that in certain locales of the country, during early Fall or Spring, temperature differentials, can exceed twice the stated EPA criteria, for temperature extremes. During the conditions stated above, line leak detectors, now certified, will fail the EPA performance requirement for a reliability of 95% detection with 5% false alarms.

Detection of leaks in the range of 0.1, 0.2 and 3 GPH with reliability, for all conditions and locales, requires a knowledge of environmental conditions, beyond the parameters for test and certification, as promulgated by the EPA.

Additionally the ultimate performance of any line leak detection system cannot be adequately determined by any test protocol, without also factoring into the evaluation, the level of technician skill required to perform a correct installation. During third party tests, systems being evaluated are properly installed, and are used in situations within the systems performance limits. However in the real world, use of such equipment, if overly complicated in installation steps, will often lead to being improperly installed and thusly the systems performance will be degraded, to below required EPA standards.

Additionally for reliability levels to remain at the required level, the system must be easily retested for performance and easily readjusted if required. With this type of equipment, simplicity of installation is mandatory, if performance is to be maintained. With many line leak systems installed and third party certified, it is surprising that an optimum system that meets the requirements above stated, remains to be produced.

The following patents are applicable examples of the current state-of-the-art of pressure decay line leak detectors:

| Reynolds; | 3,935,567 | January 27, 1976 |
|---|---|---|
| Elmore III; | 4,797,007 | January 10, 1989 |
| Michel Et Al; | 4,835,717 | May 30, 1989 |
| Hill Et Al; | 4,876,530 | October 24, 1989 |
| Slocum Et Al; | 5,103,410 | April 7, 1992 |
| Hutchinson Et Al; | 5,317,899 | June 7, 1994 |
| Filippi/Miller; | 5,372,032 | December 13, 1994 |

The following are applicable examples of flow sensing line leak detectors:

| Gerstenmaier Et Al; | 4,131,216 | December 26, 1978 |
|---|---|---|
| Maresca, Jr. Et Al; | 5,078,006 | January 7, 1992 |
| Maresca, Jr. Et Al; | 5,090,234 | February 25, 1992 |
| Williams; | 5,201,212 | April 13, 1993 |

Line leak detectors that utilize pressure decay for line leak detection are evaluated by the following statements;

Referring to Reynolds, the line leak detector therein described, fails to compensate for piping bulk modulus, temperature and differing pump off pressures. This device will not reliably find leaks below 3 GPH.

Referring to Elmore, III, the line leak detector therein described attempts to compensate for temperature, but fails to incorporate the micro-processor logic necessary for piping bulk modulus and variable pump off pressures.

Referring to Michel Et Al, the line leak detector therein described incorporates a micro-processor to interpret data from a temperature sensor, in order to compensate for fuel/pipe temperature differentials. The device fails to recognize that a single point temperature measurement, does not represent the temperature differentials along the entire length of piping. Additionally, this device fails to compensate for the piping bulk modulus and variable pump off pressures.

Referring to Hill Et Al, the line leak detector therein described incorporates various means to compensate for temperature, bulk modulus and variable pump off pressure, however, their performance is limited to a narrow range, that is insufficient for real world conditions. Temperature differentials between fuel and piping are detected by sequential testing, looking for a decrease in the time to a threshold pressure. When the decrease occurs, the effect is interpreted as due to temperature. Testing is continued until no difference is recorded in the time to the threshold pressure. If the time remains longer than 8 seconds no alarm is activated. This approach ignores the fact that sequential pump operation, itself introduces heat into the fluid, and thereby precludes an accurate measurement. Additionally, leaks below 3 GPH cannot be detected in the 8 second time and 5 PSI decay. Compensation for differing piping bulk modulus is determined by any time greater than two seconds to achieve 15 PSI, after pump shut down. This approach will only work over narrow limits, when the check/relief valves performance is tailored to a specific release rate. Compensation for variable pump off pressure, is attempted to be achieved by a spring loaded piston, delivering make-up fluid to the pressure trapped by the check/relief valve, when the pressure drop is below 12 PSI. This device is limited by its range of 4 to 11 PSI and its fluid volume of 5 cubic inches. The attempt is to persuade the pump off pressure to always be 10 PSI. Considering spring force degradation over time and the make-up volume limit, not to mention the spring force degradation of the pressure relief valve, it certainly is an impossible task.

Referring to Slocum Et Al, the line leak detector therein described incorporates many of the features of Michel Et Al, with some improvements. The primary improvement being an anti-thwart switch, that prevents continuously resetting the leak detector, by laying a brick on the reset switch. This patent does not address or describe any means, whereby any temperature differential, along the entire length of piping, are sensed. A single point or even a multiple fluid temperature sensing points, may miss a section of piping wherein significant temperature gradients may exist. In that situation a probe may indicate no temperature, wherein in fact there is a temperature gradient, further down the pipe which may create significant pressure differentials. A practical example of such a condition would be piping from a dispenser under a canopy. The canopy shades the piping thereunder, but does not shade the piping as it terminates to the underground tanks. In that case a temperature sensor under the canopy, would not sense the same temperature as the fuel in the piping that is not shaded, but in fact is warming up. This condition poses a significant restraint to finding a precision leak, with the leak detector herein described. The patent additionally fails to perform the precision leak test on any system that does not have a pump off pressure between 8 to 14 PSI. The Slocum leak detector tests from 4 to 3 PSI to determine a precision leak. For a pump with an off pressure equal to the pumping pressure, the device would not perform the precision test. For a pump with an off pressure equal to the pumping pressure, the device would not perform the precision test. For a pump with an off pressure condition that must be compensated for, even at a 3 GPH test. This patent mentions the piping bulk modulus, (air) and describes different test times, but fails to relate the test time to a bulk modulus value. For fuel piping in continuous operation, the piping bulk modulus exhibits a constant value. However, the value must be determined, and the leak detector must have a capability, to adjust its performance in accordance with the pipings particular bulk modulus.

Referring to Hutchinson Et Al, the line leak detector therein described specifically excludes the 3 GPH leak detection and claims a 0.1 GPH leak detection; on the surface this seems to be a contradiction of values. However, upon further examination, it becomes apparent that the patent cannot detect comparatively large leak rates, because of its method of operation.

This patent teaches leak detection by pressure decay monitoring with the pump on and pressure trapped between pump and dispenser. When the dispenser valve is closed, initiation of the submersible turbine pump creates a pressure spike, due to the hammer effect of the STP start-up. This initial pressure surge is higher than the normal pumping pressure of the STP.

A combination of check and pressure relief valve traps this dynamic pressure surge. Assuming the normal pumping pressure is X, then the dynamic pressure is $X+X_1$. $X_1$ is 10 to 20% of X. The check valve traps pressure since $X+X_1$ pressure is greater than X pressure.

The pressure relief valve is set to relieve at $\frac{2}{3}$ X pressure against it. Whereas, the pressure trapped side of the pressure relief valve has $X+X_1$ pressure opposing the closed position. Since $X+\frac{2}{3}X$ is always much greater than $X+X_1$, the opposing forces keep the pressure relief valve closed. Thereby the trapped pressure is monitored for a pressure decay value representing a 0.1 GPH leak.

However, for a leak rate of 3 GPH, which is 30 times greater than a 0.1 GPH leak, the process will not work! With such a comparatively large leak the dynamic pressure spike is never trapped because it is constantly being relieved by the 3 GPH leak in the pipe.

The result is the check valve allows flow into the leaking pipe 3 GPH or more, maintaining the pipe pressure, but not allowing the pressure decay required, to signal a large leak (3 GPH).

Referring to Filippi/Miller; the line leak detector therein described compensates for temperature and pipe bulk modulus, but fails to compensate for temperature extremes greater than ±25 degree F. and fails to keep installation simple.

Line leak detectors that utilize flow, for piping leak determination, exhibit different performance characteristics than pressure decay devices. However, these devices are as sensitive to the primary obstacle to accurate line leak detection, that is temperature differential, as are pressure decay devices.

Referring to Gerstenmaier Et Al, the line leak detector therein described utilizes a flow detector in a bypass piping arrangement, thereby determining a leak. The test is commenced after 30 minutes of no product pumped through the piping under test. This design is the precursor of later designs using a micro-computer for control. The fundamental fault with this design, relates to temperature stabilization of the fluid under test. The 30 minute wait without pumping product, is insufficient by several order of magnitudes. Additionally flow is determined at a constant pressure, thereby requiring the pump to be on, during the duration of the test. Pulsation of the fluid under test defeats the desired normalized fluid temperature, by introducing heat into the fluid under test.

Referring to Maresca, Jr. Et Al; patents dated Jan. 7 and Feb. 25, 1992, the line leak detector therein described, utilizes a modified flow concept. The intent is to eliminate heat induction into the test fluid, during the test cycle. For flow detection methods to work, a constant pressure is required during the flow test. The line leak detector therein described, uses a pressure chamber with an air head, to provide a relatively constant pressure during the flow test. Sets of 3 tests are performed. Flow is determined by the change of height of the test fluid, in the pressure chamber. The first and third tests are flow tested at the selected test pressure, their results are averaged. The second test is performed at zero pressure. It is assumed at zero pressure, no leakage will occur from a potential hole in the piping. The flow if any is then attributed to thermal expansion or contraction of the fluid. Flow again is measured by the change of column height in the test chamber. The average flow from test 1 and 3, is corrected by adding or subtracting test 2, depending on contraction or expansion of the test fluid, from thermal effects. An assortment of valves, pressure chamber, controllers, flow switches, piping, cabling are utilized to obtain the desired performance. The subsequent patent improves with a positive displacement pump and other methods. In addition to the overall complication of this approach, the assumption that fluid will not be lost from a leaking pipe at zero pressure, ignores the inherent pressure head, from the location of the pressure chamber.

Referring to Williams; the line leak detector therein described, does not fit into the category of a permanently installed leak detector. The patent teaches a technology for pressurized line test that is performed yearly, for detecting 0.1 GPH leak. This technology because of setup time and complication, would be impossible to use for the required 3 GPH test on a continuous basis.

OBJECTS OF THE INVENTION

Accordingly, it is the object of the present invention to provide improvements to Fiippi/Miller U.S. Pat. No. 5,372,032, granted Dec. 13, 1994. Thusly providing an improved system for detection of a leak from underground pressurized fluid lines.

It is another object of the invention to provide a pressure decay line leak detection system that will detect and compensate for differing piping bulk modului.

It is another object of the invention to provide a pressure decay line leak detection system that will automatically make all adjustments in setting, usually performed by the installer.

It is another object of the invention to provide a pressure decay line leak detector, that will perform the leak test, without requiring a pressure drop in the pump off test mode.

It is another object of the invention to provide a pressure decay line leak detector, that will not false alarm or miss a leak detection, when the temperature differential exceed the EPA ±25 degree F. differential, for the 3 GPH test.

It is another object of the invention to provide a pressure decay line leak detection system, that improves leak detection and decreases the frequency of false alarms, even when environment extremes exceed EPA mandated limits.

It is another object of the invention to provide a pressure decay line leak detection system, that retains all the desirable features of Filippi/Miller U.S. Pat. No. 5,372,032 granted Dec. 3, 1994, while reducing installation complication and reducing false alarms, even for extreme environmental conditions.

Further objects and advantages of our invention will become apparent from a consideration of the drawings and the ensuing description.

DRAWING FIGURES DESCRIPTION

FIG. 1 Leak Curve shows the pressure time relationship for a 3 GPH leak on a given pipeline system and the calculated curve for the maximum curve slope to pass a test at various pressures.

Figure 2A:
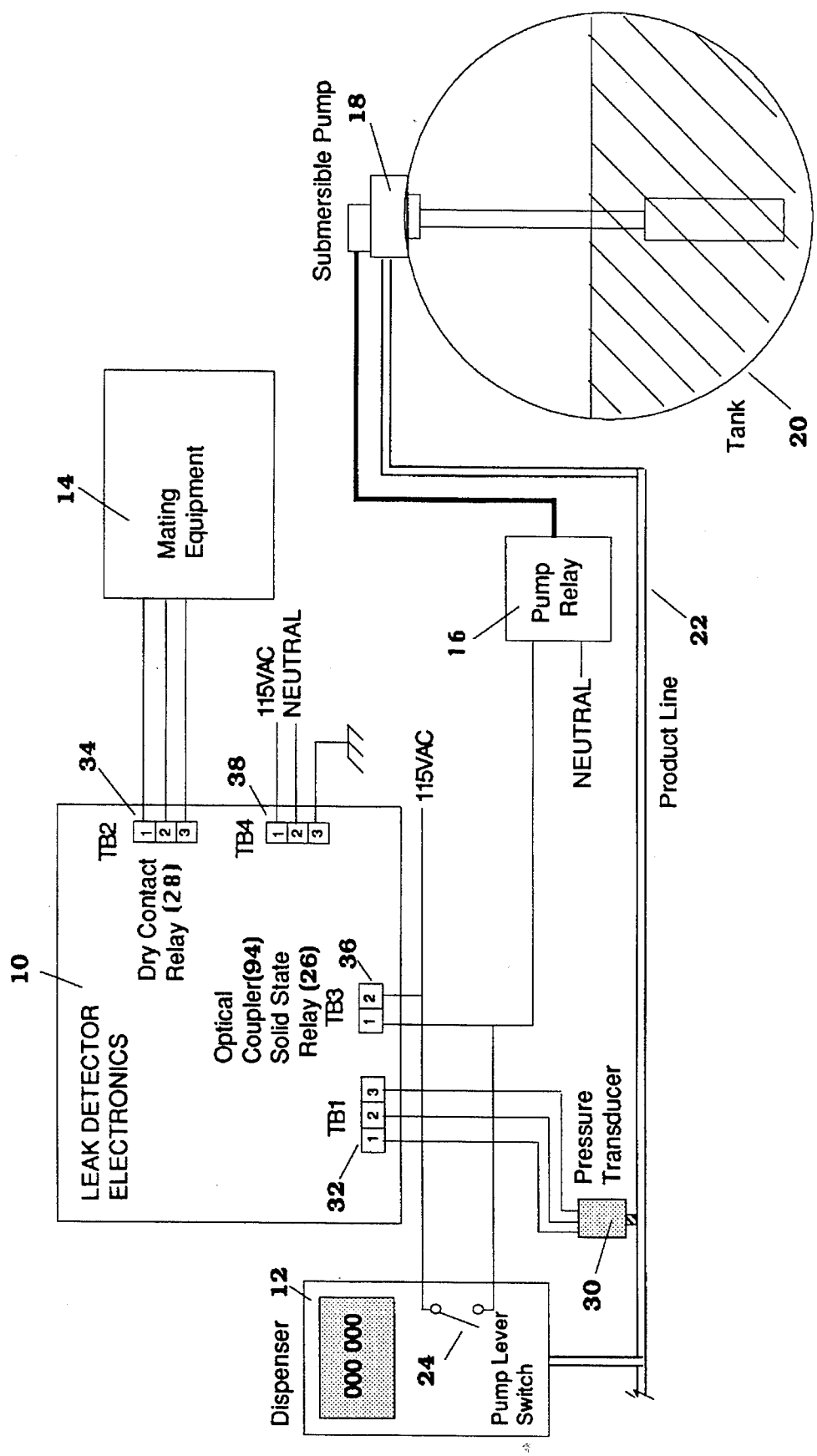

FIG. 2A System Installation and Wiring Communication Mode shows the installation of the leak detector when in the communication mode providing automatic pump activation and signaling to mating equipment.

Figure 2B:
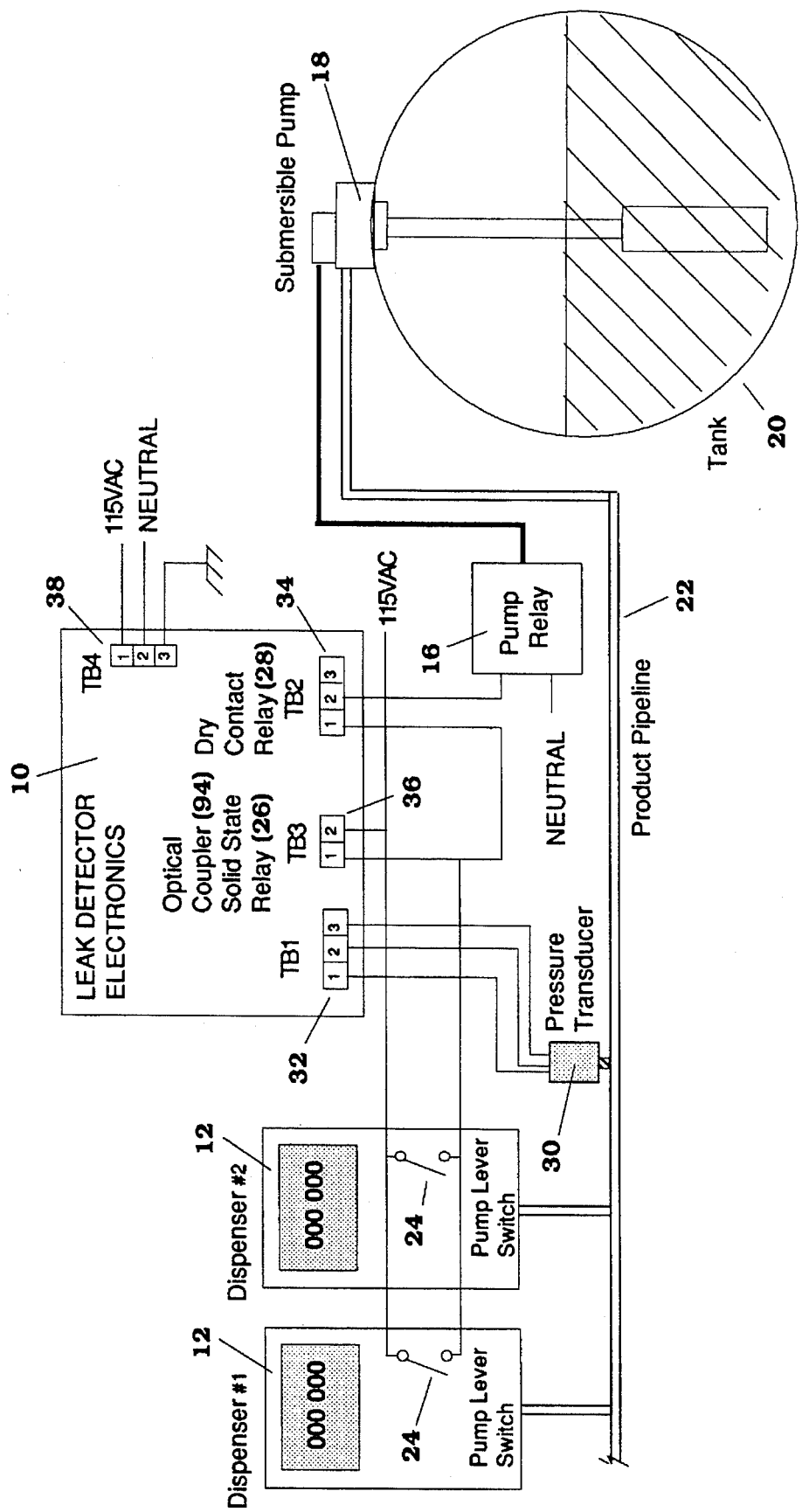

FIG. 2B System Installation and Wiring Stand-alone Mode shows the installation of the leak detector when in the stand alone mode providing automatic pump activation and automatic pump shutdown when a leak is detected.

Figure 3:
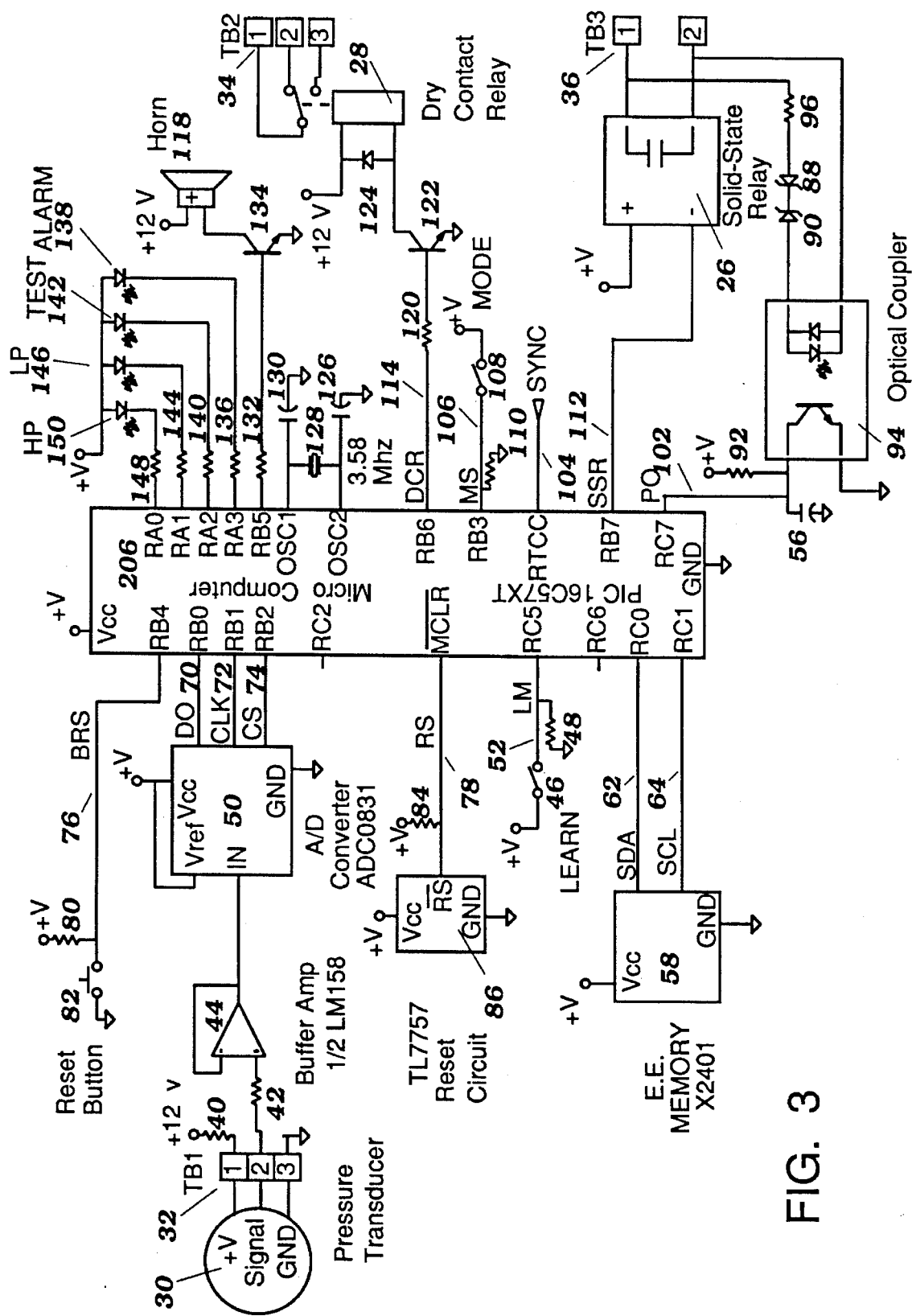

FIG. 3 Leak Detector Schematic

Figure 4:
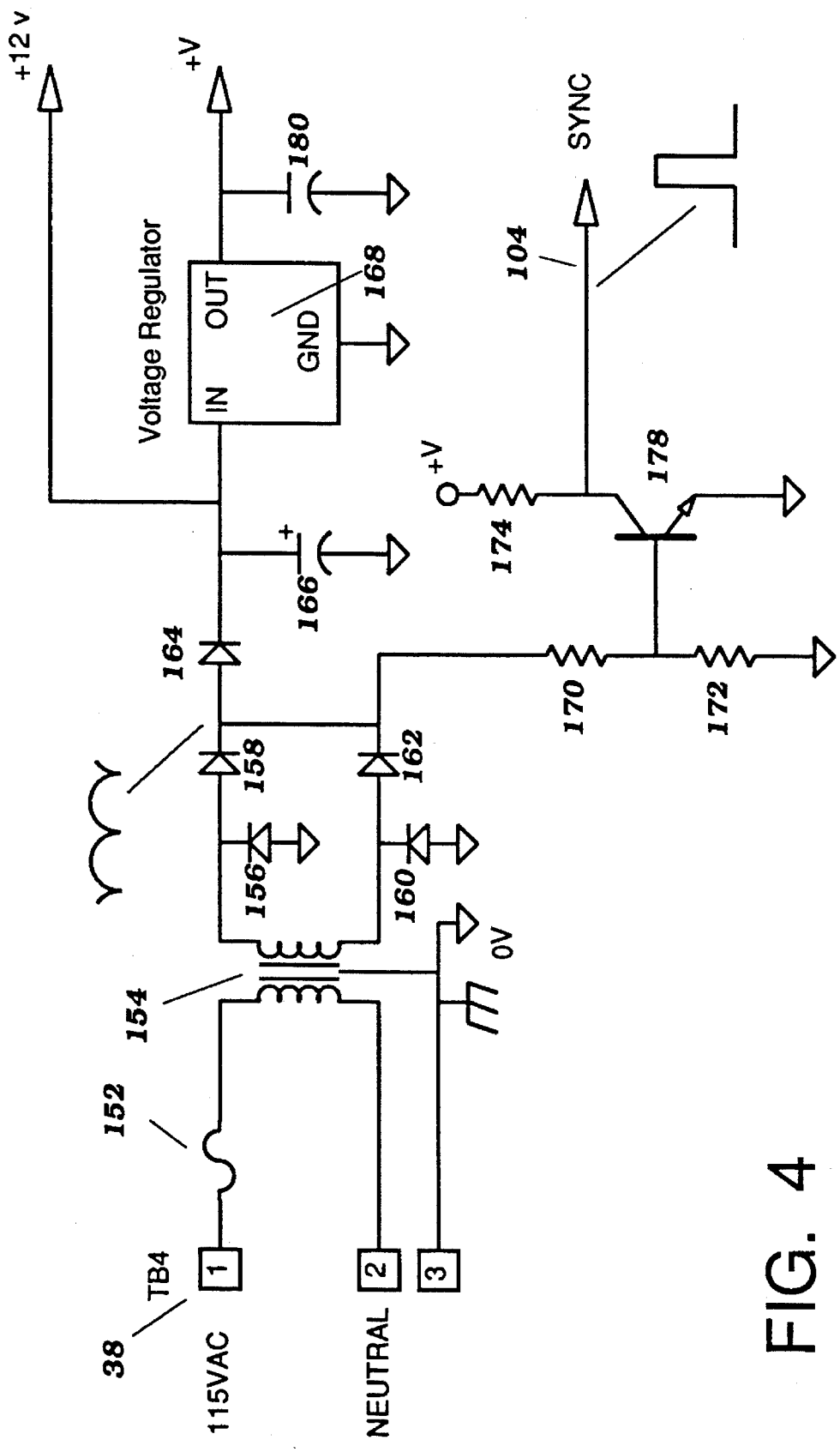

FIG. 4 Power Supply Schematic

Figure 5:
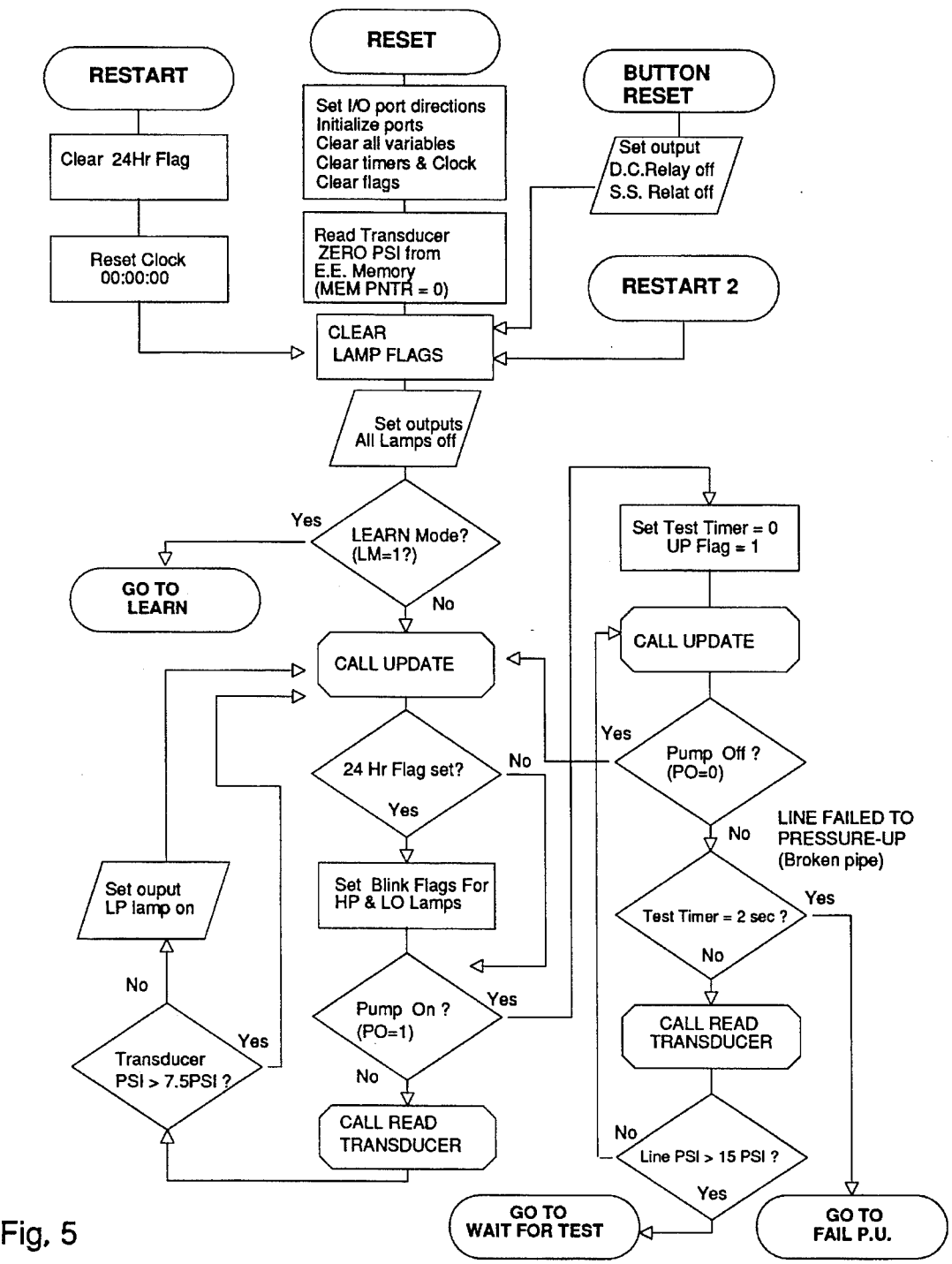

FIG. 5 Flowchart Reset

Figure 6:
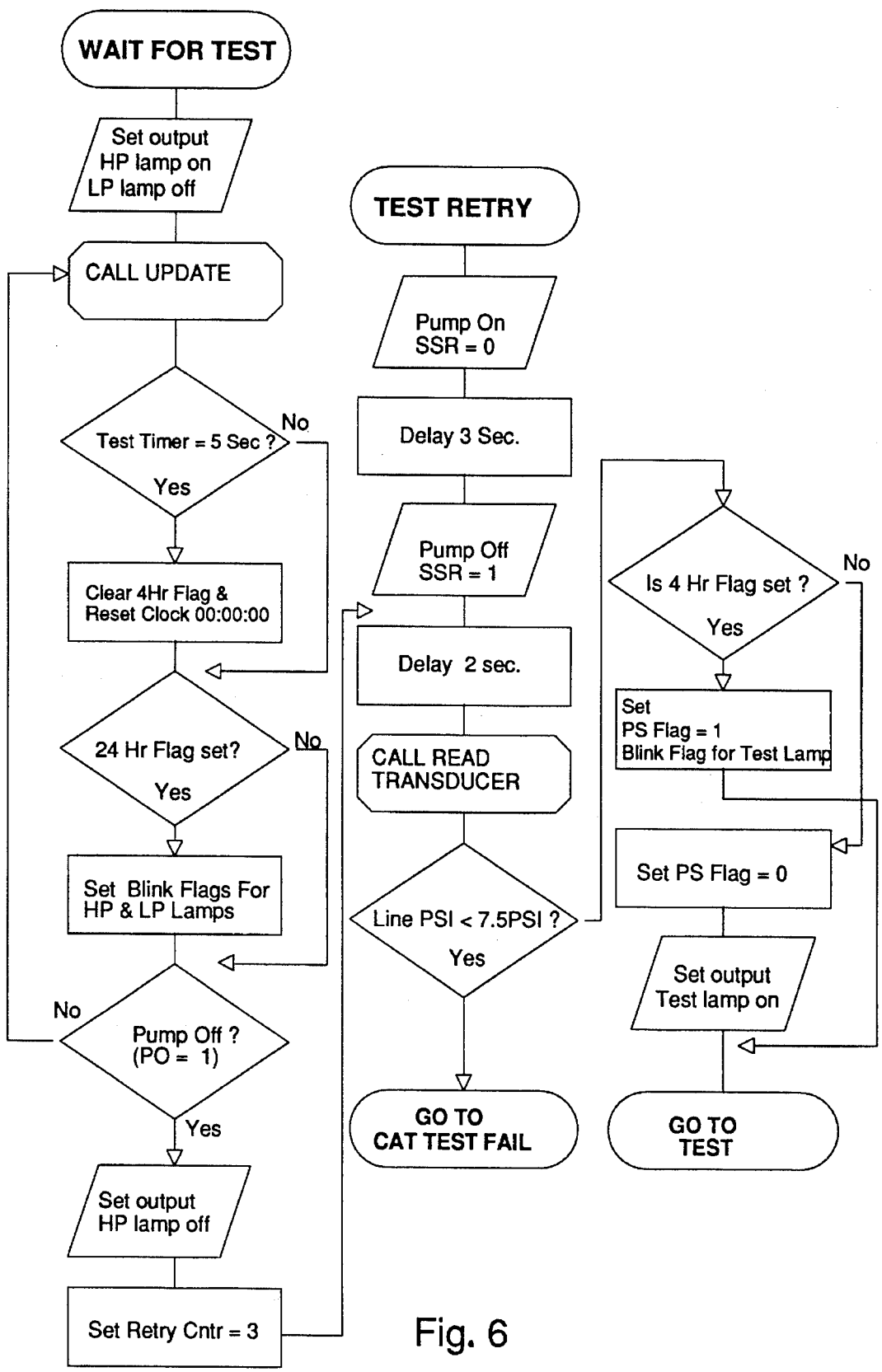

FIG. 6 Flowchart Wait for Test

Figure 7:
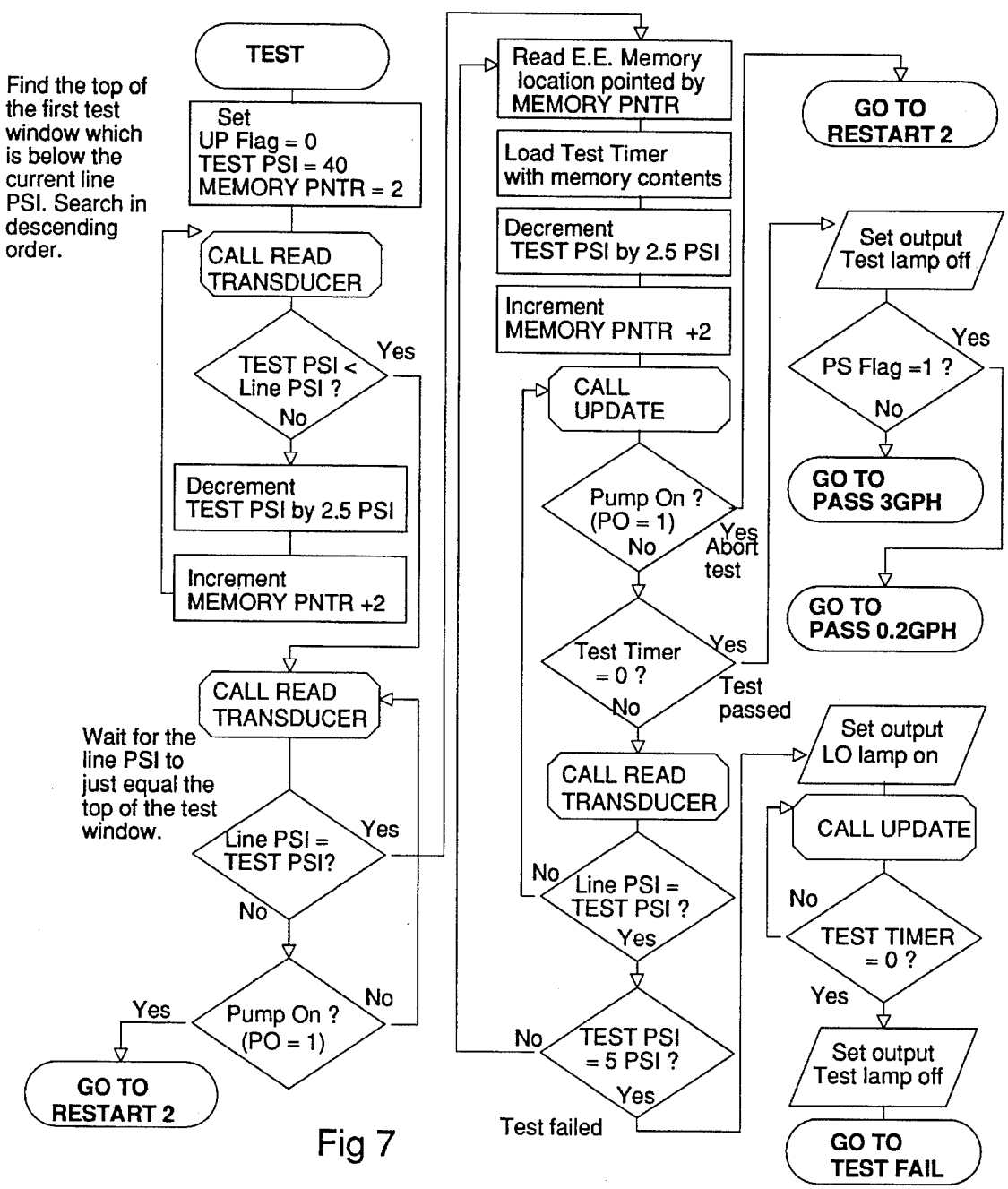

FIG. 7 Flowchart Test

Figure 8:
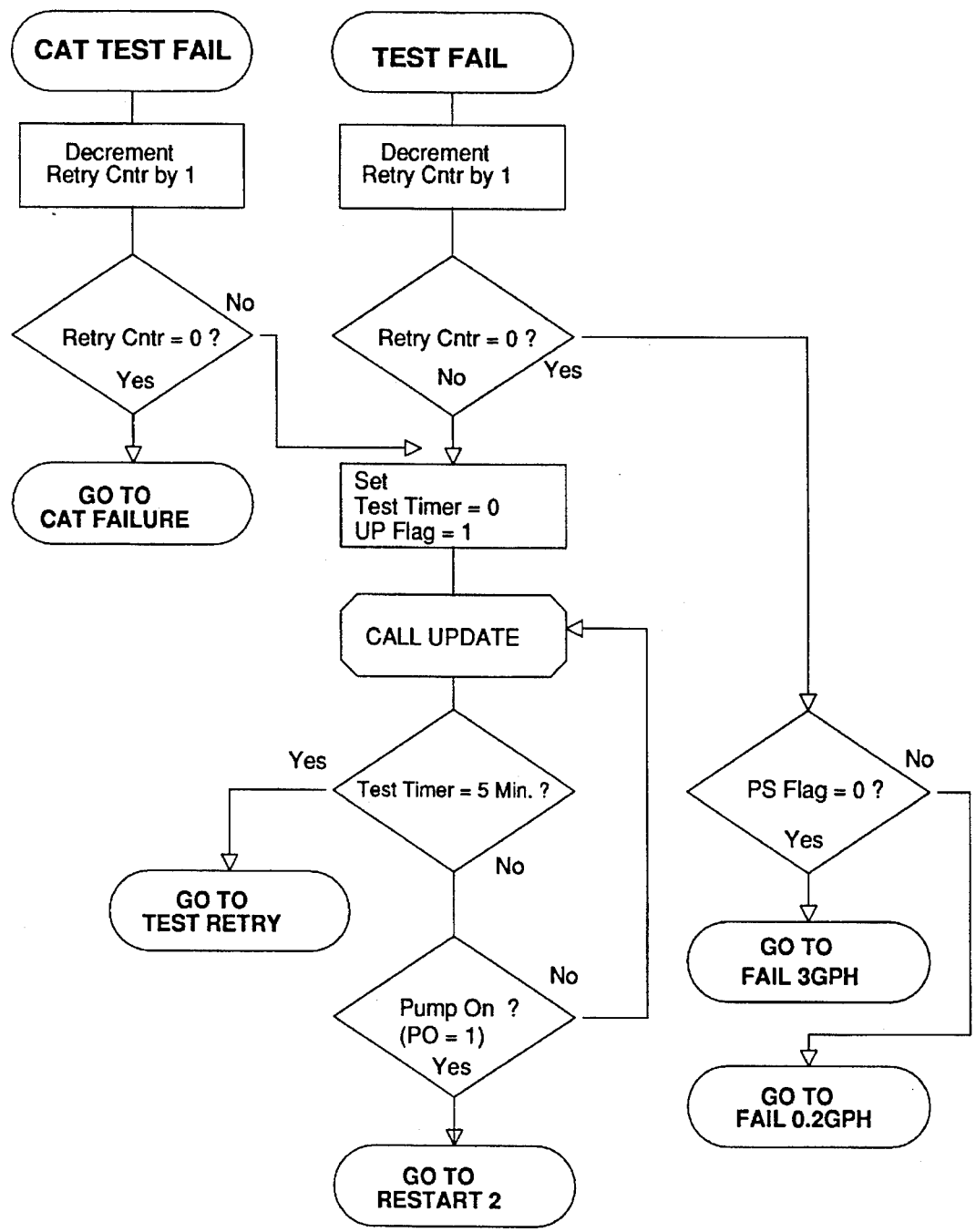

FIG. 8 Flowchart Test Retry

Figure 9:
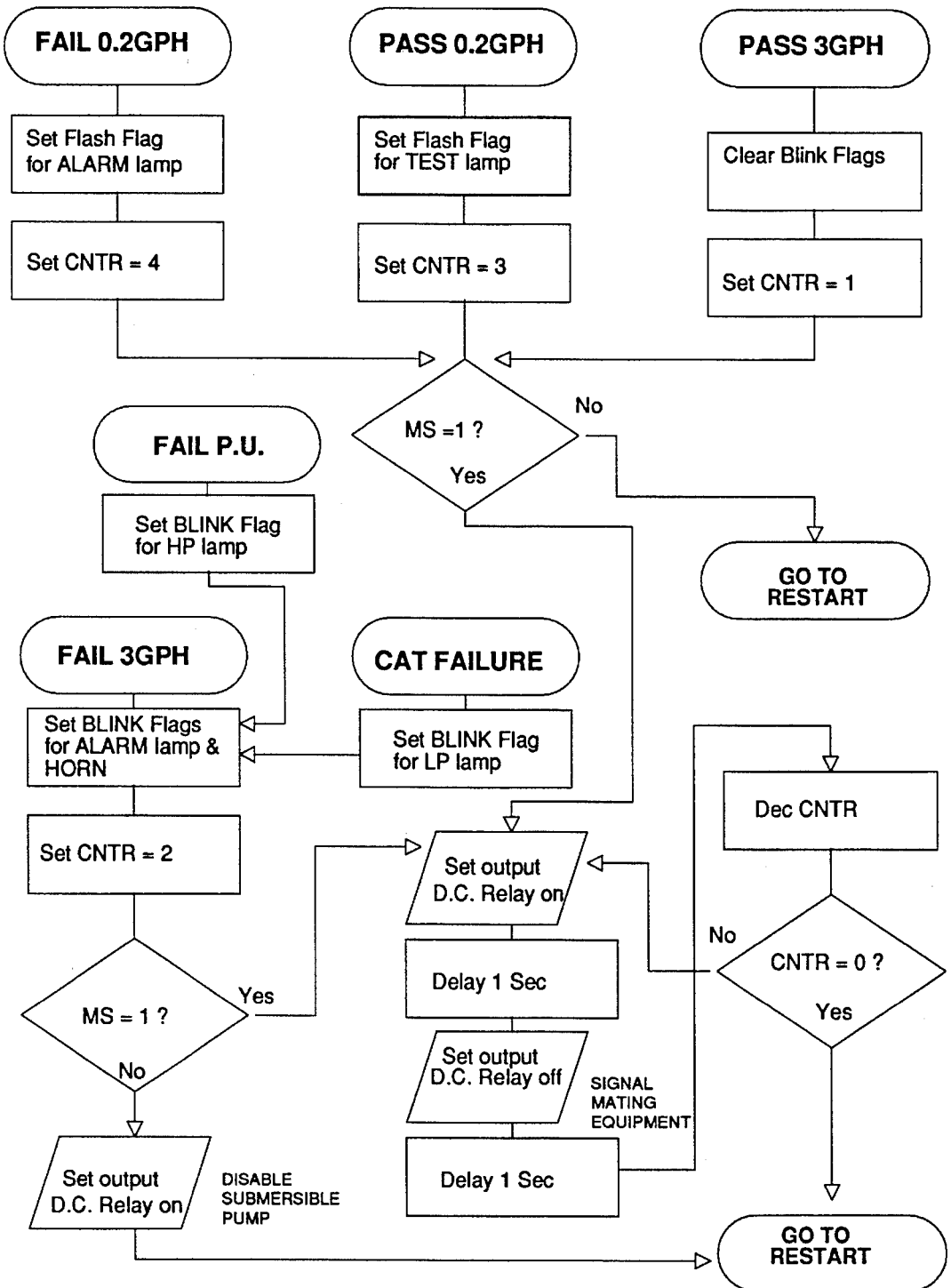

FIG. 9 Flowchart End Test

Figure 10:
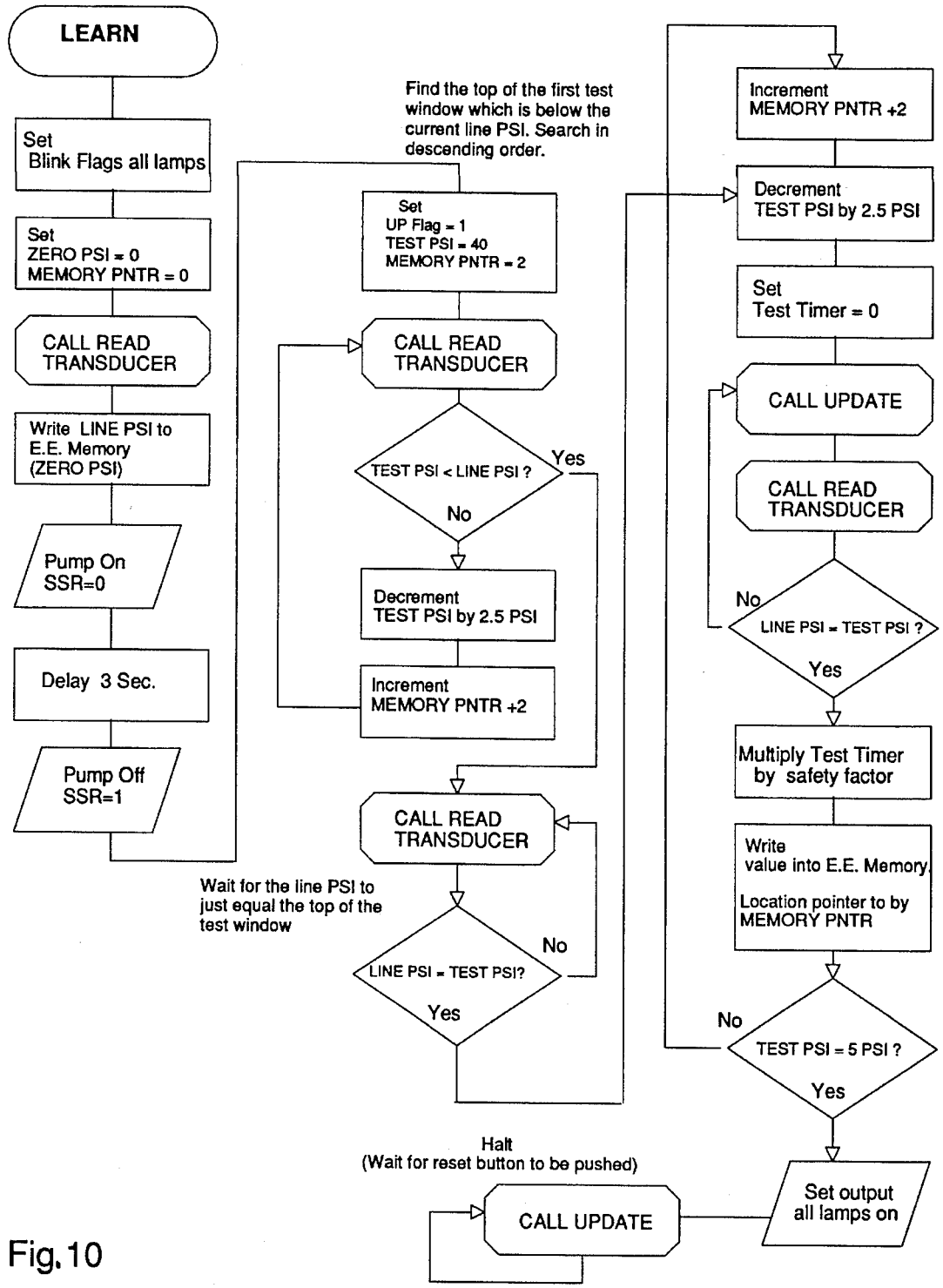

FIG. 10 Flowchart Learn

Figure 11:
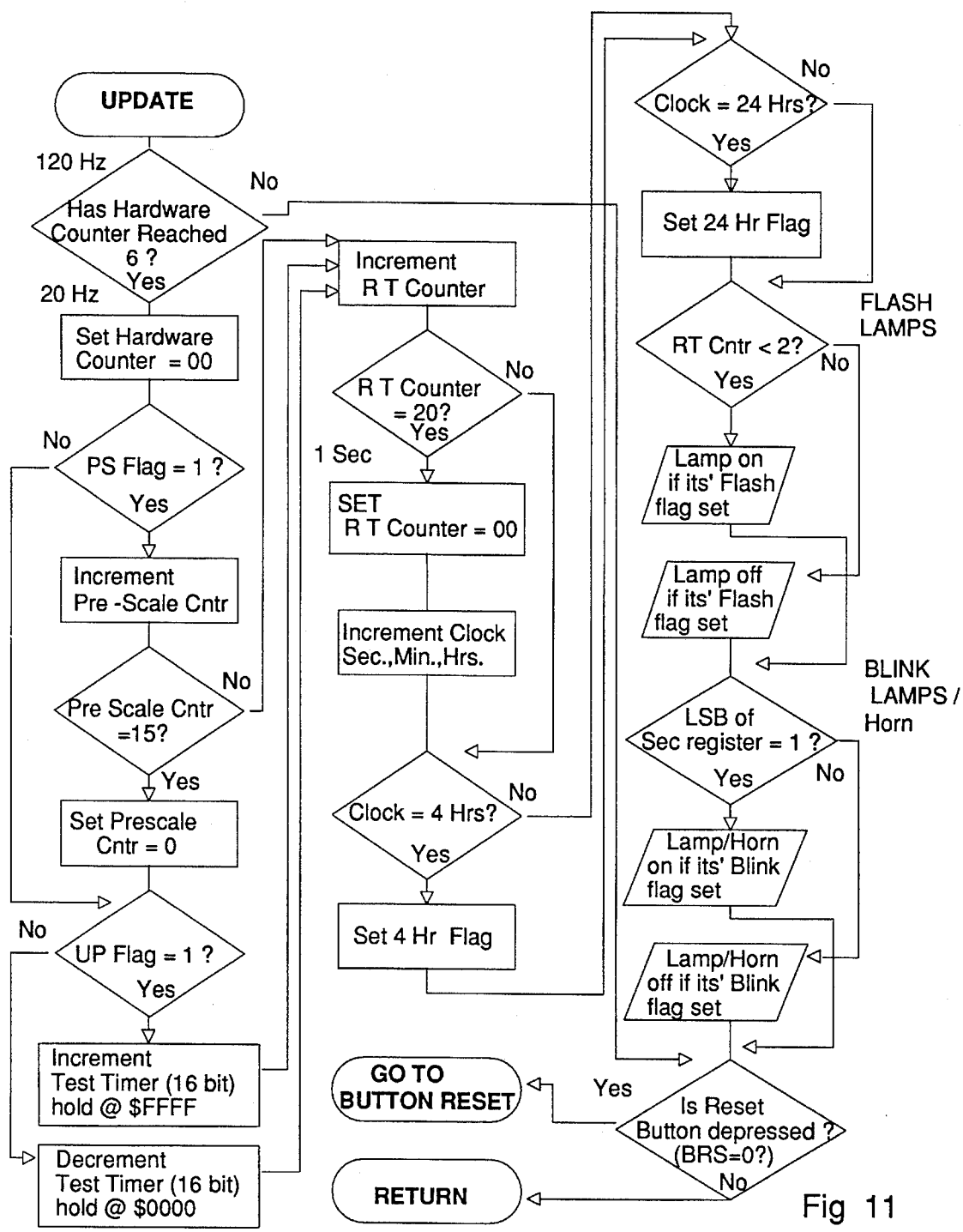

FIG. 11 Flowchart Update subroutine

Figure 12:
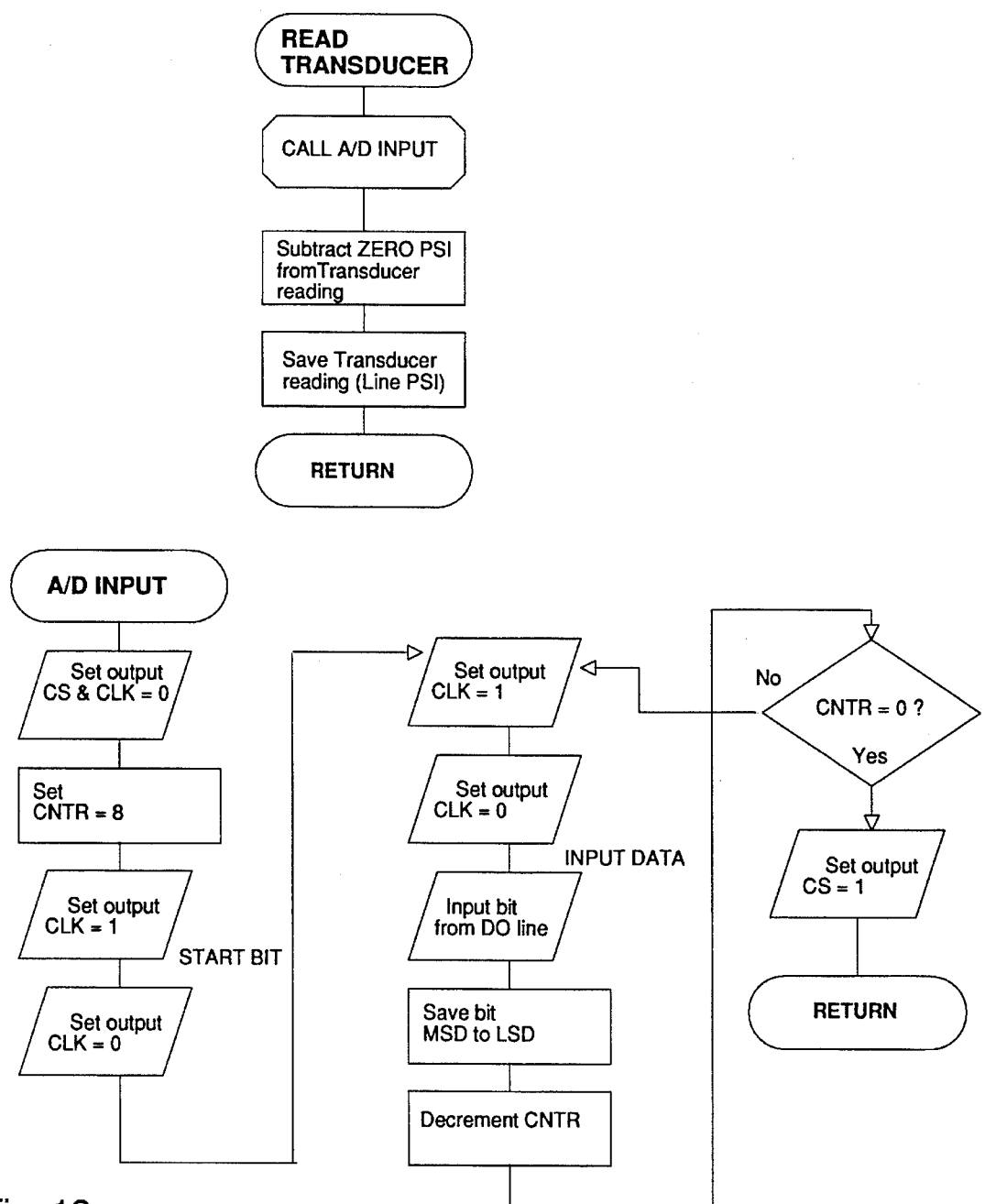

FIG. 12 Flowchart A/D Input subroutine

LIST OF DRAWING REFERENCE NUMERALS

10 Leak Detector Electronics
12 Dispenser (not part of invention)
14 Mating Equipment (not part of invention)
16 Pump Relay (not part of invention)
18 Submersible Pump (not part of invention)
20 Tank (not part of invention)
22 Product Line (not part of invention)
24 Pump Lever Switch (not part of invention)
26 Solid State Relay
28 Dry Contact Relay
30 Pressure Transducer
32 Terminal Block TB1 Pressure Transducer
34 Terminal Block TB2 Dry Contact Relay
36 Terminal Block TB3 Solid State Relay & Optical Coupler
38 Terminal Block TB4 AC Power
40 Resistor
42 Resistor
44 Buffer Amplifier, ½ National Semiconductor LM158
46 Switch
48 Resistor
50 A to D Converter, National Semiconductor ADC0831
52 LM, Logic Signal
56 Capacitor
58 E. E. Memory, Xicor X2401
62 SDA, Logic Signal
64 SCL, Logic Signal
70 DO, Logic Signal
72 CLK, Logic Signal
74 CS, Logic Signal
76 BRS, Logic Signal
78 RS, Logic Signal
80 Resistor
82 Reset Button Switch
84 Resistor
86 Reset Circuit, Texas Instruments TL7757
88 Zener Diode
90 Zener Diode
92 Resistor
94 Optical Coupler
96 Resistor
102 2 PO, Logic Signal
104 SYNC, Logic Signal
106 MS, Logic Signal
108 Switch
110 Resistor
112 SSR, Logic Signal
114 DCR, Logic Signal
118 Horn
120 Resistor
122 Transistor, NPN
124 Diode
126 Capacitor
128 Crystal, 3.58 Mhz
130 Capacitor
132 Resistor
134 Transistor, NPN
136 Resistor
138 Light Emitting Diode (Lamp)
140 Resistor
142 Light Emitting Diode (Lamp)
144 Resistor
146 Light Emitting Diode (Lamp)
148 Resistor
150 Light Emitting Diode (Lamp)
152 Fuse
154 Transformer
156 Rectifier
158 Rectifier
160 Rectifier
162 Rectifier
164 Rectifier
166 Capacitor
168 Voltage Regulator
170 Resistor
172 Resistor
174 Resistor
178 Transistor, NPN
180 Capacitor
206 Micro-Computer, Micro Chip PIC16C55XT

DESCRIPTION OF INVENTION

Referring to FIG. 2A, the following is a description of the leak detector communication mode installation to communicate with mating equipment 14. An installation site will include: a tank 20 containing liquid product, a submersible pump 18 to pump the product from the tank 20, a pump relay 16 which switches the high power to the pump 18 typically 230 VAC, a product line 22 to transport the product, and at least one dispenser 12. The leak detector is installed as follows: electronics 10 is connected to the pressure transducer 30 via terminal block 32 and the pressure transducer 30 is tapped into the product line 22 at any point along its length. The solid state relay 26 used to activate the pump relay 16 and the optical coupler 94 used to sense the state of pump lever switch 24 is wired in parallel with the pump lever switch 24, connections are made via terminal block 36. The leak detector electronics is powered by 115 VAC connected to terminal block 38. The dry contact relay 28 used for signaling is connected to the mating equipment 14 through terminal block 34.

Referring to FIG. 2B, the following is a description of the leak detector stand-alone mode installation to automatically shut down the pump 18 operation if a leak is detected. The installation site will include as mentioned above: a tank 20, a pump 18, a pump relay 16, a product line 22 and one or more dispensers 12. The leak detector electronics 10 is connected to the site in an identical manner to the communication mode for the power connection terminal block 34, solid state relay 26, optical coupler 94 and pressure transducer 30. The dry contact relay 28 normally closed contacts are wired in series with the control wire to the pump relay 16 this allows automatic shut down of pump 18.

Referring to FIG. 3 the pressure transducer 30 is connected via terminal block 32 to resistor 40, resistor 42 and system ground. Resistor 40 limits the maximum current supplied to the transducer 30 for intrinsic safety purposes. Resistor 42 connected to the buffer amp 44 input likewise limits current for intrinsic safety to the transducer 30, which might otherwise flow in the event of some circuit failure. The pressure transducer 30 outputs a signal proportional to the pressure contained in the product line 22. The output of buffer amp 44, which is required to prevent loading of the transducer signal, is connected to the A/D converter 50.

The eight bit analog to digital converter 50 is controlled by logic lines DO 70, CLK 72 and CS 74. The conversion cycle is initiated by setting CS 74 to logic 0 (0 v) followed by nine CLK 72 logic 1 (+v) to logic 0 (0 v) transitions. The first CLK 72 transition causes a start bit to be output on the DO 70 line. The next eight transitions causes the conversion results to be output on the DO 70 line with the most significant bit first and the least significant bit last. All conversions are made in reference to the positive supply voltage, which is supplied to the Vref. Logic line CS 74 must be returned to logic 1 (+v) prior to the next conversion cycle.

The reset button 82 serves as a means to signal, via the BRS 76 logic line, the program contained in micro-computer 206 when the lamp displays have been observed and can be cleared. When the reset button 82 is depressed the BRS 76 line is logic 0 (0 v) otherwise the BRS 76 line is pulled up by resister 80 to logic 1 (+v).

The reset circuit 86 provides a logic 0 (0 v) reset pulse from the RS not output, when the electronics is first powered up. The RS not output, is connected to the MCLR not, hardware reset input, of the micro-computer 206 via the RS 78 line. Resistor 84 pulls up the RS 78 line to a logic 1 (+v) following the reset pulse. The reset plus time duration should be sufficient to allow the oscillator circuitry to enter stable operation prior to its' termination.

The oscillator circuitry is comprised of crystal 128, capacitor 126, and capacitor 130. The oscillator circuitry is connected to the OSC1 and OSC2 pins of the micro-computer 206. Capacitors 126 and 130 provide the necessary phase shift for proper oscillator operation.

The light emitting diodes (also referred to as lamps) Test 142, LP 146 and HP 150 provide visual indication as to the status of the leak detector electronics 10. The following is the possible indications which may be displayed:

HP lamp 142 on continuously, indicates that the product line 22 pressurized, pump 18 is on.

LP lamp 146 on continuously, indicates that the product line 22 is pressure is less than the allow lower limit of the last available test window during a leak test or that the product line 22 pressure is less than 7.5 PSI prior to a test.

Test lamp 142 on continuously, indicates that a 3 GPH test is in progress.

Test lamp 142 blinking, indicates that a 0.2 GPH test is in progress.

Test lamp 142 flashing, indicates that a 0.2 GPH test has passed.

Alarm lamp 138 blinking, indicates that the 3 GPH test has failed or the product line 22 failed to trap sufficient pressure to conduct a test or the product line 22 failed to pressurize properly (Broken pipe).

Alarm lamp 138 flashing, indicates that a 0.2 GPH test has failed.

HP lamp 150 and LP lamp 146 both blinking, indicates that a test has not been conducted within the last 24 hours and that a failed transducer may be suspected.

Blinking is defined as a repeating cycle of the lamp on for one second and off for one second. Flashing is defined as a repeating cycle of the lamp on for one tenth of a second and off for nine tenths of a second.

The light emitting diodes 138, 142, 146 and 150 are connected to the micro-computer 206 outputs RA3, RA2, RA1 and RA0 through resistors 136, 140, 144 and 148 respectively, which provide current limiting. A logic 0 (0 v) at outputs of the micro-computer 206 will cause the associated light emitting diode to illuminate.

Horn 118 provides an audio indication in conjunction with the alarm lamp 138. The Horn 118 is turned on for 1 second and then off for one second in a repeating cycle using the blink function of the program contained in the micro-computer 206. A logic 1 (+v) at the output RB5 of the micro-computer 206 causes the horn 118 to turn on by sourcing current through resistor 132 to the base of transistor 134, which in turn is a low side driver for the horn 118.

The dry contact relay 28 provides a means to shut down submersible pump 18 operation by interrupting the circuit to the pump relay 16 when in the stand-alone mode (Refer to FIG. 2B).

The dry contact relay 28 also provides a means to signal mating equipment 14 by pulsing the contacts a specific number of times to signal a given test result when in the communication mode (Refer to FIG. 2A). The following are signals, which may be sent:

One pulse signals that the 3 GPH test has just passed.

Two pulses signals that the 3 GPH test has just failed or the product line 22 has failed to pressure up (possible broken pipe) or the product line 22 has failed to catch sufficient pressure for a test to be conducted (catastrophic leak).

Three pulses signals that the 0.2 GPH test just conducted has passed.

Four pulse signals that the 0.2 GPH test just conducted has failed.

A logic 1 (+v) on the DCR 114 logic line connected to output RB6 of the micro-computer 206, causes the dry contact relay 28 to activate by sourcing current through resistor 120 to the base of transistor 122, which in turn is the low side driver for the dry contact relay 28. Diode 124 across the coil of the dry contact relay 28 suppresses transients generated when transistor 122 is turned off. Connections to the dry contact relay 28 are made via the terminal block 34.

The solid state relay 26 provides a means to turn on the submersible pump 18 for 3 seconds when it is time to initiate a test (Refer to FIGS. 2A&2B). A logic 0 (0 v) on the SSR 112 logic line connected to output RB7 of the micro-computer 206, causes the solid state relay 26 to activate. The program contained in the micro-computer 206 initiates a test when a test has failed and a retry is indicated or after the submersible pump 18 has not been in operation for 4 hours. Connections to the solid state relay 26 are made via terminal block 36.

The optical coupler 94 provides a electrically isolated means to sense if 115 VAC is present across terminal block 36. If 115 VAC is not present then pump lever switch 24 must be closed and pump relay 16 on, and therefore the pump 18 is operating. If 115 VAC is present then the pump 18 is assumed to be not operating. Resistor 96 provides current limiting for the input LED of the optical coupler 94. The combination of zener diodes 88, 90 prevent possible false triggering by requiring significant voltage (Zener voltage +0.6 V) before current is supplied to the input LED. Resistor 92 is the pull-up for logic line PO 102 connected to RC7 of the micro computer 206, which is in turn connected to the open collector output of the optical coupler 94. Capacitor 56 is sized to filter out the 60 Hz pulsing of the output of the optical coupler 94, due to sensing an AC voltage, to maintain a stable logic level. A logic 1 (+v) on PO 102 indicates the pump 18 is on.

Switch 108 provides a means to signal to the program contained in micro-computer 206 as to the desired mode of operation. When switch 108 is closed logic line MS 106, which is connected to the RB3 input of the micro-computer 206, is set to a logic 1 (+v) indicating to the program that the communication mode is desired. Pull down resistor 110 maintains the MS 106 line at a logic 0 (0 v) when switch 108 is open indicating that the stand-alone mode of operation is desired.

Switch 46 provides a means to signal to the program contained in micro-computer 206 that the learn mode is selected. When switch 46 is closed logic line LM 52, which is connected to the RC5 input of the micro-computer 206 is set to a logic 1 (+v) indicating to the program that a calibrated leak is connected to the piping system and the leak curve is to be learned. Pull down resistor 48 maintains the LM 52 line at a logic 0 (0 v) when switch 46 is open indicating that the test mode of operation is desired.

E. E. Memory (Electrically Erasable Memory) 58 provides a means to store 128 bytes of data protected from power outages. Location 0 is used to save the transducer reading for zero PSI (ZERO PSI). Locations 2 through 127 are used to save test times of 2 bytes each. The 4.0 PSI to 37.5 PSI test time is stored in locations 2 and 3, while 37.5 PSI to 35.0 PSI test time is stored in locations 4 and 5, and so on. Data is read and written via logic lines SDA 62 and SCL 64. Logic line SCL 64 serves as a clock signal for sending and receiving data on bidirectional logic line SDA 64. The interface protocol involves sending an address followed by data to write a byte or sending an address and then receiving data to read a byte.

Referring to FIG. 4 the power supply outputs two voltages and a logic signal used for timing by the micro-computer 206. The +12 V supply voltage is used by the horn 118, the dry contact relay 28 and by the pressure transducer 30 after being fed through resistor 40.

The +V supply voltage is used by all other components.

The SYNC 104 logic signal is a pulse, which is generated for each half cycle of the 115 VAC supplied to transformer 154. For 115 VAC at 60 Hz the SYNC 104 pulse will occur every 8.33 Ms or at a 120 Hz rate. The SYNC 104 signal is connected to the RTCC input of the micro-computer 206. Internal to the micro-computer 206 is a hardware counter, which counts the number of SYNC 104 pulses arriving at the RTCC input. At a predetermined number of pulses the program contained in the micro-computer 206 will up-date its' time keeping.

The external 115 VAC power is connected via the terminal block 38, which provides connections for: the hot 115 VAC to TB4-1, the neutral to TB-2, and a protective ground to TB-3. The 115 VAC is connected to transformer 154 via fuse 152 for primary circuit protection, a requirement for intrinsic safety. The neutral is connected directly to the transformer 154. The protective ground is connected to the core of transformer 154 and the power supply ground (0 v), also a requirement for intrinsic safety.

The secondary of transformer 154 is connected to rectifiers 156, 158, 160 and 162, which form a full wave bridge. The output of the bridge at the junction node of rectifiers 158 and 162 is connected to rectifier 164. Rectifier 164 provides decoupling between capacitor 166 and the output of the bridge to prevent distortion of the rectified waveform. The output of the bridge is fed to the voltage divider formed by resistors 170 and 172. The values of resistors 170 and 172 are selected such that the node between the resistors 170 and 172 will supply sufficient base drive to turn transistor 178 on at approximately one half of the bridge peak voltage. The collector of transistor 178 connected to resistor 174 is the source for the SYNC 104 signal.

Connected to capacitor 166 is the input of voltage regulator which regulates the +V supply voltage (+5 volts was used for +V). Capacitor 180 at the output of voltage regulator 168 is required for high frequency bypass.

OPERATION OF INVENTION

Referring to FIG. 1, illustrates the pressure curve for a piping system when a leak is present, in this case a calibrated 3 GPH leak (bold line curve), for both pump on and off conditions. The horizontal bands indicated the pressures of the multiple 2.5 PSI test windows over which tests are performed starting at 40 PSI and ending at 5 PSI. Note that the time taken to pass through each test window is always changing with the shortest times at the higher pressures. Further, the modulus of a given piping system has a direct effect on the times, the higher the volume loss per PSI, the longer the time.

Before a test can be performed the test times for each test window below the pumping pressure must be learned. Then a maximum allowed slope is calculated for each test window and the resulting test time is stored for future reference (the fine line curve). The maximum allowed slope is calculated to prevent misdetections of 3 GPH leaks during periods of thermal expansion. Pressure loss during a 3 GPH test causing a slope greater then the calculated maximum allowed slope is considered a piping leak, a failed test. For 0.2 GPH tests the calculated maximum slope is decreased in the order of 15 times by multiplying the test time by that factor during the actual test.

The test times are learned by connecting a calibrated 3 GPH leak to the pipeline 22 and then selecting the learn mode via switch 46 and depressing the reset button 82. At which time the transducer 30 zero pressure reading is stored, which is used to correct all subsequent transducer readings for zero offset. The pump 18 is turned on for a short time via solid state relay 26 and pump relay 16 to pressurize the line. Immediately following turning the pump 18 off the pressure will start to fall, as the pressure falls through each test window the elapse time is recorded for each window. Each test time is multiplied by a safety factor and stored, thereby calculating the maximum allowed slope.

It is important to note that the invention is not limited to 3 GPH as the calibrated leak, nor is it limited to 0.2 GPH leak tests. In fact, if the calculated slope is decreased by a factor of 30 then a 0.1 GPH test will be performed.

Referring to FIG. 2A, which shows a typical installation. The leak detector is best understood by describing a pumping cycle and how the leak detection tests relates to it.

The pumping cycle is initiated by the closure of a pump lever switch 24 thereby suppling 115 VAC to the winding of the pump relay 16. The pump relay 16 activates and supplies the high power to the submersible pump 18. The pump 18 now running, the product line 22, is pressurized in the range of 20 to 30 PSI with the liquid product drawn from tank 20. The leak detector electronics 10, notes that the pump is on via optical coupler 94 and then allows 2 seconds for the pressure to attain a level greater than 15 PSI, if not, a pressure up failure is alarmed. During dispensing the HP lamp 150 is illuminated indicating that pump 18 is on.

When dispensing is completed the pump lever switch 24 is opened de-energizing the pump relay 16, which in turn shuts down the submersible pump 18. The pressure in the product line 22 will remain pressurized very near the pumping pressure. The pressure is maintained in the product line 22 by a check valve and relief valve, which is set at a pressure greater than the pumping pressure, both of which are contained in the submersible pump 18. The pump off is detected by the leak detector electronics 10 by the fact that AC voltage is sensed by the optical coupler 94 across TB3 36. The HP lamp 150 is turned off and a 2 second delay is executed prior to initiating a test. The 2 second delay allows time for the pump 18 to come to rest and the check valve to fully seat.

Following the 2 second delay one of two leak tests are performed. If the current dispensing cycle was less than 5 seconds and if dispensing has not occurred in the previous 4 hours then the 0.2 GPH test is performed, otherwise the 3 GPH test is performed. The short dispensing cycle of less then 5 seconds is automatically caused by the leak detector electronics 10 by closing the solid state relay 26 for 3 seconds when a dispensing cycle has not occurred within the previous 4 hours or when a test has failed and a retry is indicated. Two test retries are allowed following the first test failure, each is preceded by a 5 minute wait. A pressure-up test failure is not retried.

Assuming that the criteria for the 0.2 GPH test was met, the test lamp 142 is setup to blink indicating that the 0.2 GPH test is in progress. Also, the test timer is set to operate at a slower rate then the 3 GPH test, the rate is controlled by a prescaler value.

Next, the line pressure is measured and the highest test window is determined by finding the first test window with an upper pressure limit which is just below the current line pressure (Refer to FIG. #1). Next, the detector waits until the line pressure just reaches the upper limit of the selected test window. When the pressure is reached, the test timer is loaded with the value read from the E. E. memory 58 for the selected test window, which was previously stored by the learn process. At this point the product line 22 pressure is continuously monitored until the test time has concluded or the pressure drops below the low limit of the test window. If the test time concludes before the line pressure drops below the lower limit then the test is logged as a pass. The test lamp 142 is setup to flash to indicate a successful 0.2 GPH test. If the line 22 pressure drops below the low limit, the next lower test window is selected and a new window test restarted. If no lower test windows are available (the line pressure is less than 5 PSI) then the test has failed, the LP lamp 146 is illuminated. When the test timer has timed out test lamp 142 is turned off. When a test fails it may be retried again after a 5 minute wait. If after two retries the test still fails then the test is logged as a failure. The alarm lamp 138 is setup to flash to indicate a failed 0.2 GPH test.

The 3 GPH test operates in the same manner as the 0.2 GPH test with some exceptions. The test lamp 142 is illuminated continuously as an indication that a 3 GPH test is in progress. The test timer is setup to run at full speed, no prescaler. If the test fails the alarm lamp 138 is setup to blink and the horn 118 is activated using the blink function.

At the conclusion of a test the leak detector electronics 10 will, depending on the mode selected by switch 108, communication or stand-alone, will signal to mating equipment 14 using the dry contact relay 28 or disable the pump 18. In the communication mode the dry contact relay 28 is pulsed a specific number of times to signal the test results. The signal pulses are generated by closing dry contact relay 28 for 1 second at 2 second intervals. In the stand-alone mode the dry contact relay 28 is used to disable the submersible pump 18 by interrupting the control circuit between the pump lever switch 24 and the pump relay 16 as shown in FIG. 2A & 2B.

With the required relay operations complete the leak detector electronics 10 can return to monitoring the product line 22 for the next dispensing cycle.

The alarm indications for both the pressure up failure and catastrophic leak mentioned above are the same as the 3 GPH test failure.

The flow of the program contained in the micro-computer 206 is shown in FIG. 5 through FIG. 12. The discussion of the program will start with the subroutines of FIG. 11 and 12 because repeated references are made to them in other parts of the program.

The UPDATE subroutine (Referring to FIG. 11) is responsible for all the time keeping, lamp flashing and lamp/horn blinking. This subroutine is continuously being called by the main portion of the program. The time between calls is quite short, much less than the 8.33 Ms (120 Hz) rate at, which the hardware counter is incremented by the logic signal SYNC 104.

When UPDATE is entered the first decision is, if the hardware counter is equal to 6 then the timing is incremented, if not, jump to the last decision in the routine.

Following the yes branch, which occurs at a 20 Hz rate, the hardware counter is cleared. The PS flag is check, if set then the pre-scale counter is incremented. When the pre-scale counter reaches 15 it is reset to zero and the test timer is incremented or decremented depending on the state of the UP flag. If the PS flag is equal to zero then the test timer immediately incremented or decremented. If the UP flag is set, the test timer is incremented and will hold when it reaches the hexidecimal value FFFF, if not, the test timer is decremented until zero is reached. The test timer has a range of 0.050 seconds to 54.6 minutes. The RT counter is then incremented. If the RT counter is equal to 20, which occurs once a second, then the RT counter is cleared, and the clock incremented. At this point the clock is checked for being equal to 4 hours and if it is, the 4 Hr flag is set. The 4 Hr flag will be used as a signal to the main program that a 0.2 GPH test can be performed.

If the clock is equal to 24 hours then the 24 Hr flag is set. The 24 Hr flag is used by the main program to determine if a test cycle has been performed in the last 24 hours.

Next, if the RT counter is less than 2, then all the lamps 138, 142 that have their flash flag set will be turned on, otherwise they will be turned off. The RT counter repeats its' 20 count cycle in one second, which means flashing lamps will be on for 0.1 second and off 0.9 second.

Next, lamps 138, 142, 146, 150 with their blink flags set and the horn 118 if its' blink flag is set are cycled. If the least significant bit of the seconds register of the clock is logic 1, then the lamps/horn 118 will be turned on, if not, they are turned off. The least significant bit of the seconds register toggles once a second, therefore blinking will be on for one second then off for one second.

The last decision is to determine if the button reset is depressed. If the BRS 76 logic line is equal to logic 0, then the program leaves the routine by going to BUTTON RESET in the main program, otherwise a normal return to the calling portion of the main program is performed.

Referring to FIG. 12. The A/D INPUT subroutine inputs the eight bit conversion value from the analog to digital converter 50.

To start the conversion cycle both the CS 74 and CLK 72 logic line are set to logic 0.

Next, a counter is set to eight to keep track of the bits as they are input.

The CLK 74 logic line is set to logic 1 then to logic 0, to clock passed the start bit prior to collecting the data bits.

The CLK 74 logic line is again set to a logic 1 then to 0. The fist data bit is now present on the DO 70 logic line.

The bit is input from the DO 70 logic line and saved with the first bit as the most significant bit and the last bit the least significant.

The counter is decremented and then checked for zero to determine if the last bit has been input. If the counter is equal to 0, indicating that the last bit has been stored, then the CS 74 logic line is set to logic 1 and a return performed. If the counter is not zero then the next bit is input.

The READ TRANSDUCER subroutine calls the A/D INPUT subroutine, corrects the transducer reading for offset then saves the transducer value for future reference.

The A/D INPUT subroutine is called and the value ZERO PSI is subtracted from the reading to correct for transducer offset. The value ZERO PSI is equal to the transducers' uncorrected reading when the product pipeline 22 has zero pressure contained in it. The value ZERO PSI was read and stored during the learn routine. The transducer value is then saved as the value Line PSI.

Referring to FIG. 5.

RESET is the starting point of the main program when the power is first turned on. The first step is basic housekeeping: the port directions are set, the port outputs are set to their initial logic states, all variables cleared, the clock and timers set to zero along with all flags cleared.

The offset correction value ZERO PSI is read from the E. E. Memory 58. The lamp flags are cleared.

The logic line LM 52 is check to see if it equals a logic one (+v), if so, then the program proceeds to the LEARN routine.

The subroutine UPDATE is called to up-date all timing functions.

The 24 Hr flag is checked and if it is set then the HP 150 and LP 146 lamp's blink flags are set. This is an indication that a leak test has not been performed in the last 24 hours. If it is known that a dispensing cycle has occurred within the last 24 hours then a transducer failure can be suspected.

The pump status is checked, if on, logic line PO 102 equal to logic one (+v), the program jumps to a section of code which tests for a broken pipe.

The READ TRANSDUCER subroutine is called. If the transducer value is less than 7.5 PSI then the LP lamp 146 set on and returns to previous "CALL UPDATE".

If previously the pump was determined to be on, the test timer is cleared and set to increment, UP flag=1.

The UPDATE subroutine is again called to up date the timing functions.

If the timer is equal to 2 seconds then the program goes to FAIL P.U., which means that the product line 22 failed to pressurize within 2 seconds and a broken pipe is suspected.

READ TRANSDUCER is called, if the transducer value is greater than the 15 PSI then the program proceeds to WAIT FOR TEST. In the event the pump is turn off, logic line PO 102 equal logic zero (0 v), while waiting for the test timer to reach 2 seconds the program jumps to the previous loop to start the process over.

When the reset button 82 is depressed the program is restarted at the BUTTON RESET entry point, which turns the dry contact relay 28 off to clear a submersible pump 18 shut down.

When a leak test is completed, the program is restarted at the RESTART entry point. At which time the 24 Hr flag is cleared indicating that a leak test has been performed. The clock is also cleared.

When a test is aborted because product dispensing occurred in the middle of the test, the program is restarted a the RESTART2 entry point.

Referring to FIG. 6.

At this point the product line 22 is pressurized and a leak test will be performed when the submersible pump 18 is shut down.

The HP lamp 150 is turned on and the LP lamp 146 off.

The UPDATE subroutine is called to up-date the timing functions.

The timer is checked for being equal to 5 seconds. If it is, then the 4 Hr flag is cleared and the clock reset to prevent a 0.2 GPH test from being performed, because with the pump 18 on for greater than 5 seconds the temperature stability has been disturbed.

The 24 Hr flag is checked, if it is set, then both the HP 150 and LP 146 lamp's blink flags are set. This is an indication that the pump 18 appears to have been operating continuously for the last 24 hours. If it is known that the pump 18 has been off within the last 24 hours then a transducer failure can be suspected.

The pump is checked and if it has turned off, proceed to the next steps, if not, return to the preceding "UPDATE" call.

With the pump off the HP lamp 150 is turned off.

The Retry Counter is set to 3, which is the total number of failed tests performed in a row before the leak alarm is sounded. Each time a test fails the counter is decremented.

A 2 second delay is performed to allow the pump 18 to come to rest. READ TRANSDUCER is called and if the line pressure is less than 7.5 PSI, meaning a catastrophic leak is present in the line and it is unable to retain enough pressure to perform a test using the lowest test window, then the program proceeds to CAT TEST FAIL.

The 4 Hr flag is checked. If the 4 Hr flag is set, then the Blink flag is set for Test lamp 142, the PS flag is set indicating to the UPDATE routine to pre-scale the test timer and the program goes to TEST. Otherwise it clears the PS flag, turns the Test lamp 142 on continuously and goes to TEST.

Following a test failure, if a test retry is allowed (Retry Cntr is not equal to zero), the program enters at TEST RETRY and cycles the pump 18 on for 3 seconds to re-pressurize the product line 22.

Referring to FIG. 7.

The TEST routine is used when performing either a 3 GPH or a 0.2 GPH leak test. The difference is that when a 0.2 GPH test is to be performed, the test timer is setup to be pre-scaled (PS set) prior to entering.

The UP flag is set to zero to cause the test timer to decrement. The TEST PSI value is set to 40 PSI, which is the top of the highest test window. The MEMORY pointer is set to location 2, which is the location in the E. E. Memory 58 containing the test time for the 40 to 37.5 test window.

The first step in starting the test is to find the top pressure limit of the first test window which is just below the current line pressure. This is accomplished by calling READ TRANSDUCER, if TEST PSI is less than the line PSI then proceed to the next step, if not, decrement the TEST PSI by 2.5 PSI to the next lower test window and increment the MEMORY pointer to the next test time location.

The next step is to wait for the line PSI to just equal the top pressure limit of the test window, which is the same as the TEST PSI value. READ TRANSDUCER is called and if the line Pressure is equal to the TEST PSI value, then the program continues on to the next part of the test. If the pump is activated for dispensing the test is terminated and the program is restarted at RESTART2, if not, the line pressure is read once again.

Finally the test for the highest test window is started. Tests are conducted for each test window starting with the highest window first followed by lower windows until an individual window test passes or no more windows are available, at which a test is considered as failed. A window test passes when the line pressure first equals the top pressure limit of a given test window and then does not fall to the window's lower pressure limit within the allowed test time for that particular window.

The test time is read in from the E. E. Memory 58 pointed to by the MEMORY pointer value and the test timer is loaded. The TEST PSI value is decremented by 2.5 PSI, it now is equal to the lower pressure limit of the test window. The MEMORY pointer is incremented to the next memory location.

UPDATE is called to operate the timing functions. The pump is check for activity, if it is on, the test is aborted and the program restarted at RESTART2. The test timer is checked for zero, if it is, then the window test passed. The line pressure is read by calling READ TRANSDUCER and the line pressure is compared to the TEST PSI value, if not equal, then the program loops back to "CALL UPDATE". If the line PSI is equal to the TEST PSI value and is not equal to 5 PSI, then the next lower window test is started by jumping to "Read E. E Memory". Test windows are not available below 5 PSI, therefore, if TEST PSI does equal 5 PSI the test has failed. The LP lamp 146 is turned on, followed by a wait for the test timer to equal zero, after which the Test lamp 142 is turned off. The program then proceeds to TEST FAIL.

In the event the test passes, the Test lamp 142 is turned off and the PS flag is examined to determine the type of test just preformed. PS flag equal to one means a 0.2 GPH test was performed and the program proceeds to PASS 0.2 GPH, otherwise it proceeds to PASS 3 GPH.

Referring to FIG. 8.

Test failures and catastrophic test failures are examined to see if a retry is allowed, and if so, a wait of 5 minutes is instituted to give time for any extreme thermal conditions which may have caused the test failure to subside. Following the wait the test is then retried.

Catastrophic failure enters at CAT TEST FAIL and the retry counter is decremented. If the retry counter is equal to zero, no more retries are allowed, the programs proceeds to CAT FAILURE.

Test failures enter at TEST FAIL and likewise the retry counter is decremented and checked for zero. If the retry counter is zero then the program proceeds to FAIL 3 GPH if the PS flag equals zero, otherwise to FAIL 0.2 GPH.

If a retry is allowed, a 5 minute wait loop is started. The test timer is set to zero and the UP flag is set to 1 so the test timer will increment. UPDATE is called to operate the timing functions. When the test timer equals 5 minutes a test retry test is initiated by going to TEST RETRY. If the pump activates at any time during the 5 minute wait the test sequence is terminated, the program goes to RESTART2.

Referring to FIG. 9.

Whenever there is a pressure-up failure is detected or the results of a test are to be reported, the program execution is routed through this section of the program. If the operating mode is set for communication mode (MS 106=1) then the particular results are signaled via the dry contact relay 28. If set for the stand-alone mode (MS 106=0) then the dry contact relay 28 is activated to disable the submersible pump 18.

Following the FAIL 0.2 GPH entry point, the flash flag is set for the Alarm lamp 138 and the counter is set to the value 4.

Following the PASS 0.2 GPH entry point the flash flag is set for the Test lamp 150 and the counter set to 3.

Following the PASS 3 GPH entry point the blink flags are cleared and the counter set to 1.

The three preceding entry points converge to a mode decision. If logic line MS 106 is equal to 1 then the communication mode is selected and the test results are signaled to the mating equipment 14. If the MS 106 is not equal to 1 then the program goes to RESTART.

Signaling to the mating equipment 14 is accomplished by setting the dry contact relay 28 on, delaying one second and then setting the relay 28 off followed by another delay of one second. The counter is decremented and then checked for zero, if it is not, the relay 28 is again cycled on and then off. The number of cycles is determined by the number set in the counter by each entry point.

With the signaling is complete the program resumes monitoring for the next dispensing cycle by going to RESTART.

Following the FAIL P.U. entry point the blink flag for the HP lamp 150 is set and then goes to the FAIL 3 GPH entry point.

Following the CAT FAILURE entry point the blink flag for the LP lamp 146 is set and then goes to the FAIL 3 GPH entry point.

Following the FAIL 3 GPH entry point the blink flags for the Alarm lamp 138 and the horn 118 are set and the counter is set to 2. The operating mode is then determined. If logic line MS 106 is 1 then the results are signaled as described above and the program goes to RESTART. If logic line MS 106 is not 1 then the dry contact relay 28 is turned on to disable the submersible pump 18 and then the program goes to RESTART.

Referring to FIG. 10.

When a known leak (3 GPH) is connected to the pipeline 22 this program routine will learn the unique test time required for each test window below the pumping pressure. The time for a known leak to pass through each test window is measured, which is then multiplied by a safety factor and stored. The routine operates in a similar fashion to the TEST routine with the following exceptions: the test timer is set to increment, the test timer contains the measured time of the test window when the window lower pressure limit is reached and a 2 second delay is not performed following the pump 18 turn off. Prior to any time measurements, the transducer 30 output is read with zero pressure in the product pipeline 22, which is subsequently use to correct the transducer readings for offset.

After first entering the LEARN routine the Blink flags are set for all lamps as an indication to the operator that learning is in progress.

Next, the ZERO PSI value is set to zero and the MEMORY pointer is set to location 0. READ TRANSDUCER is called to determine the transducers' output for zero pressure. The value is stored in E. E. Memory 58 in the location pointed to by the MEMORY pointer.

The pump 18 is turned on for 3 seconds to pressurize the product pipeline 22.

The UP flag is set to 1 to cause the test timer to increment. The TEST PSI value is set to 40 PSI, which is the top of the highest test window. The MEMORY pointer is set to location 2, the location in the E. E. Memory 58 in to which the test time for the 40 to 37.5 test window is stored.

Starting the actual learning process, the first step is to find the top pressure limit of the highest test window which is just below the current line pressure. This is accomplished by calling READ TRANSDUCER, if TEST PSI is less than the line PSI then proceed to the next step, if not decrement the TEST PSI by 2.5 PSI to the next lower test window and increment the MEMORY pointer to the next test time storage location.

The next step is to wait for the line PSI to just equal the top pressure limit of the test window, which is the same as the TEST PSI value. READ TRANSDUCER is called and if the line Pressure is equal to the TEST PSI value then the program continues on to the next part of the learning process, if not the line pressure is read once again.

Finally the test time measurement for the highest test window is started. Test time measurements are conducted for each test window starting with the highest window first followed by lower windows.

The TEST PSI value is decremented by 2.5 PSI so it equals the lower pressure limit of the current window. The test timer is set to zero. UPDATE is call to operate timing functions followed by a call of READ TRANSDUCER. If the line pressure equals the lower pressure limit (TEST PSI), the test timer is multiplied by a safety factor and stored into the E. E. Memory 58. If TEST PSI value equals 5 PSI then the last test window has just been measured, set all lamp outputs on to indicate to the operator that the learning is complete, if not, increment the MEMORY pointer and measure the next lower window. The program finally halts and waits for the Reset button 82 to be depressed. The operator would open switch 46 before depressing the reset button 82 to have the detector return to normal leak detection mode.

CONCLUSION AND SCOPE

Federal and State laws required that underground pressurized fuel lines be continuously monitored for 3 GPH leaks (hourly) and periodically monitored for 0.1 GPH leaks (yearly) or 0.2 GPH leaks (monthly).

Referring to U.S. Pat. No. 5,372,032, thousands have been installed nationally and required improvements to the subject line leak detector have become apparent. This invention incorporates all the features of U.S. Pat. No. 5,372,032, while making two significant improvements the first improvement is to remove installation complication, relating to testing the existing lines for their bulk modulus and having to make the appropriate adjustments to the controller. This invention does the task automatically. The magnitude of the installation complication reduction is demonstrated by the reduction of pages, for the LS300-120 PLUS "User Instructions", from fourteen to one page. The second improvement is to improve leak detection or remove false alarm, relating to the 3 GPH test, when environmental conditions exceed the EPA standard. The pressure decay line leak detector, thusly described, enhances performance and affordability.

We claim:

1. A pressure decay leak detection system for a pressurized fluid piping system incorporating a pump, comprising:

pressure measuring means for measuring the fluid pressure in the pressurized fluid piping system and providing an electrical signal representing the measured pressure;

pump monitoring means for monitoring operational status of the pump;

indicating means for indicating leak detection test results to operating personnel;

automatic calibration means connected to said pressure measuring means for introducing a leak with a known leak rate into the pressurized fluid piping system, measuring pressure decay versus time for the piping system while the system is leaking at said known leak rate, and calculating and storing a maximum allowed pressure decay profile for increments of pressure decay based on the measured pressure decay versus time information;

test control means connected to said pressure measuring means, said pump monitoring means, said indicating means, and said automatic calibration means, for testing for leaks during a test cycle by monitoring pressure decay in the piping system during a period following pump activation, determining an elapsed time for at least one observed increment of pressure decay, comparing a slope of the at least one observed increment of pressure decay to a slope of the maximum allowed pressure decay profile for said increment of pressure decay; and activating said indication means to indicate a test failure, if said slope of said observed pressure decay exceeds said slope of the maximum allowed pressure decay profile.

2. The system of claim 1 wherein said test control means further comprises means for performing multiple tests during a single test cycle.

3. The system of claim 1 wherein the automatic calibration means includes means for multiplying actual elapsed time for each increment of pressure drop by a safety factor to obtain said maximum allowed pressure decay profile.

4. The system of claim 1 wherein the automatic calibration means includes means for scaling the maximum allowed pressure decay profile obtained at said known leak rate to obtain a pressure decay profile for a leak rate different from said known leak rate.

5. An improved pressure decay leak detection system for a pressurized fluid piping system comprising:

pressure indicating means for measuring the fluid pressure in the pressurized fluid piping system and providing an electrical signal representing the measured pressure;

indicating means for indicating leak detection test results to operating personnel;

calibration means connected to the pressure indicating means and comprising a memory, for introducing a leak with a known leak rate into the pressurized fluid piping system, monitoring pressure in the pressurized fluid piping system while the system is leaking, and storing pressure versus time data defining a calibrated leak pressure decay profile for increments of pressure decay in the memory;

scaling means connected to the memory for scaling the calibrated leak pressure decay profile to define a scaled profile representing a leak rate for testing different from said known leak rate;

testing means connected to the pressure indicating means, the calibration means, and the indicating means, for testing for leaking during a test cycle by sensing an observed pressure in the pressurized fluid piping system, determining a slope of measured pressure decay versus time for an observed increment of pressure decay, comparing a slope of the observed increment of pressure decay with a slope of the corresponding pressure decay increment of the scaled profile for the leak rate for testing, and activating said indication means to indicate a test failure, if said slope of said observed pressure decay exceeds said slope of the scaled profile.

6. The system of claim 5 wherein the calibration means includes means for multiplying an actual elapsed time for each increment of pressure drop by a safety factor to obtain said pressure decay profile.

7. The system of claim 5 further comprising pump monitoring and control means connected to the testing means for monitoring the activation of a pump pressurizing the piping system and for selectively activating the pump.

8. The system of claim 7 wherein the testing means initiates a leak detection test following an operator activation of the pump wherein the scaled profile represents a leak rate of 3 GPH.

9. The system of claim 7 wherein the testing maxis includes means for automatically initiating a leak detection test wherein the scaled profile represents one of a 0.1 GPH leak rate and a 0.2 GPH leak rate of an operator has not activated the pump for a predetermined time period.

10. The system of claim 7 wherein the testing means includes broken pipe alarm means for providing an indication if the piping system fails to attain a predetermined pressure in a predetermined time period after actuation of the pump.

11. A process for detecting leaks in a pressurized fluid piping system, comprising the steps of:

providing a pressure indicating means for measuring a fluid pressure decay over time in the pressurized fluid piping system;

establishing a standard profile of pressure decay versus time appearing in the pressurized fluid piping system after a pump shutoff, for a predetermined rate of leakage from the piping system;

conducting a leakage test after a pump shutoff by sensing a pressure in the pressurized fluid piping system, determining a slope of measured pressure decay of the pressurized fluid piping versus time for an increment of pressure decay, and comparing a slope of the increment of measured pressure decay of the pressurized fluid piping system with a slope of the corresponding increment of pressure decay of the standard profile; and activating said indication means to indicate a test failure, if said slope of said measured pressure decay exceeds said slope of the standard profile.

12. The process of claim 11 comprising the further step of scaling the standard leak profile to define a scaled profile representing a leak rate different from said predetermined rate of leakage.

13. The process of claim 11 comprising the further step of performing an additional test for 3 GPH leakage prior to declaration of a test failure.

14. The process of claim 11 comprising the further step of shutting down the pump as an indication of a test failure.

15. The process of claim 11 comprising the further step of signalling pass or fail status of the test to other computer based equipment.

16. The process of claim 11 comprising the further step of automatically establishing the pressure decay profile by introducing a leak with a known leak rate into the pressurized fluid piping system, monitoring pressure in the pressurized fluid piping system while the system is leaking, and storing pressure versus time data defining the calibrated leak pressure decay profile in a memory.

17. The process of claim 11 wherein the pressure decay profile consists of a series of time entries representing minimum acceptable times for successive pressure decays of predetermined like increments when the piping system is not leaking in excess of said predetermined rate of leakage, and wherein in the step of conducting a leakage test, elapsed time for a pressure decay of said predetermined increments is measured, and if said elapsed time is less than said minimum acceptable time for said pressure decay, indicating a leak condition.

* * * * *